United States Patent
Neginhal et al.

(10) Patent No.: US 11,907,745 B2
(45) Date of Patent: *Feb. 20, 2024

(54) METHODS AND SYSTEMS FOR SECURELY AND EFFICIENTLY CLUSTERING DISTRIBUTED PROCESSES USING A CONSISTENT DATABASE

(71) Applicant: VMware LLC, Palo Alto, CA (US)

(72) Inventors: Srinivas Neginhal, Belmont, CA (US); Medhavi Dhawan, Cupertino, CA (US); Vjekoslav Brajkovic, Mountain View, CA (US); Cheng Zhang, Palo Alto, CA (US); Jiaqi Chen, Santa Clara, CA (US); David Tsai, Palo Alto, CA (US); Maithem Munshed, Palo Alto, CA (US); Zeeshan Lokhandwala, Palo Alto, CA (US); Ming Wen, Palo Alto, CA (US); Ragnar Edholm, Sunnyvale, CA (US); Rajneesh Bajpai, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/157,075

(22) Filed: Jan. 25, 2021

(65) Prior Publication Data

US 2021/0141660 A1 May 13, 2021

Related U.S. Application Data

(63) Continuation of application No. 16/255,768, filed on Jan. 23, 2019, now Pat. No. 10,901,771.

(51) Int. Cl.
*G06F 9/46* (2006.01)
*G06F 9/455* (2018.01)
(Continued)

(52) U.S. Cl.
CPC .......... *G06F 9/45558* (2013.01); *G06F 3/062* (2013.01); *G06F 3/067* (2013.01);
(Continued)

(58) Field of Classification Search
CPC .. G06F 9/45558; G06F 16/1827; G06F 3/062; G06F 3/0662; G06F 3/067; G06F 2009/45562; H04L 63/0869
(Continued)

(56) References Cited

U.S. PATENT DOCUMENTS

| 8,352,450 B1 | 1/2013 | Mraz et al. |
| 9,569,513 B1 | 2/2017 | Vig et al. |

(Continued)

*Primary Examiner* — Bradley A Teets
(74) *Attorney, Agent, or Firm* — King Intellectual Asset Management

(57) ABSTRACT

Certain embodiments described herein are directed to methods and systems for adding one or more nodes to a first cluster including a first node in a computer system. A method performed by the first node comprises receiving a first request from a second node to join the first cluster. The method also comprises retrieving a first cluster configuration associated with the first cluster from a distributed database through a first database server (DBS) and creating a second cluster configuration using the first cluster configuration and information received from the second node as part of the request. The method further comprises populating a first one or more local trust stores of a first one or more processes executing on the first node with a second one or more security certificates of a second one or more processes executing on the second node. The method further comprises writing the second cluster configuration to the distributed database and returning the second cluster configuration to the second node.

20 Claims, 13 Drawing Sheets

(51) Int. Cl.
*H04L 9/40* (2022.01)
*G06F 16/182* (2019.01)
*G06F 3/06* (2006.01)

(52) U.S. Cl.
CPC ........ *G06F 3/0662* (2013.01); *G06F 16/1827* (2019.01); *H04L 63/0869* (2013.01); *G06F 2009/45562* (2013.01)

(58) Field of Classification Search
USPC ........................................................ 718/104
See application file for complete search history.

(56) References Cited

U.S. PATENT DOCUMENTS

| | | |
|---|---|---|
| 10,901,771 B2* | 1/2021 | Neginhal .............. G06F 3/0607 |
| 2007/0220375 A1 | 9/2007 | Baz |
| 2013/0013723 A1 | 1/2013 | Deshmukh et al. |
| 2013/0132958 A1 | 5/2013 | Jain et al. |
| 2015/0127625 A1 | 5/2015 | Bulkowski et al. |
| 2016/0034490 A1 | 2/2016 | Woo |
| 2017/0262519 A1 | 9/2017 | Horowitz et al. |
| 2017/0262638 A1 | 9/2017 | Horowitz et al. |
| 2019/0278749 A1 | 9/2019 | Yoakley |
| 2019/0334765 A1 | 10/2019 | Jain et al. |
| 2020/0125662 A1 | 4/2020 | Zhu et al. |
| 2020/0205055 A1 | 6/2020 | Snodgrass |
| 2020/0233689 A1 | 7/2020 | Neginhal et al. |
| 2020/0233853 A1 | 7/2020 | Neginhal et al. |

* cited by examiner

METHODS AND SYSTEMS FOR SECURELY AND EFFICIENTLY CLUSTERING DISTRIBUTED PROCESSES USING A CONSISTENT DATABASE

CROSS-REFERENCE TO RELATED APPLICATIONS

This application is a continuation of U.S. patent application Ser. No. 16/255,768, filed Jan. 23, 2019. The entire contents of this application are hereby incorporated by reference in their entirety.

BACKGROUND

Software defined networking (SDN) comprises a plurality of hosts in communication over a physical network infrastructure, each host having one or more virtualized endpoints such as virtual machines (VMs) or containers that are connected to logical overlay networks that may span multiple hosts and are decoupled from the underlying physical network infrastructure. SDN involves the use of a management plane and a control plane. The management plane is concerned with receiving network configuration input from an administrator and generating desired state data that specifies how the logical network should be implemented in the physical infrastructure. The management plane may have access to a database for storing the network configuration input. The control plane is concerned with determining the logical overlay network topology and maintaining information about network entities such as logical switches, logical routers, and endpoints, etc. The logical topology information is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host.

Typically, the management plane and control plane operate as distributed applications to allow for fault tolerance and high availably. A distributed application refers to a software application or program that is executed on multiple computing devices (e.g., physical computing devices, virtualized endpoints, etc.) within a system or network. For example, a number of different management processes, each executing on a different computing device, may implement the functions of the management plane. In such an example, the different processes are clustered such that they are able to recognize each other, share workloads, and operate together as a single management plane. Clustering processes of one or more distributed applications, such that the processes are able to efficiently and securely discover, trust, communicate, and synchronize together, however, is a challenge.

DETAILED DESCRIPTION

Aspects presented herein relate to systems and methods for securely and efficiently clustering distributed processes using a consistent database.

Figure 1:
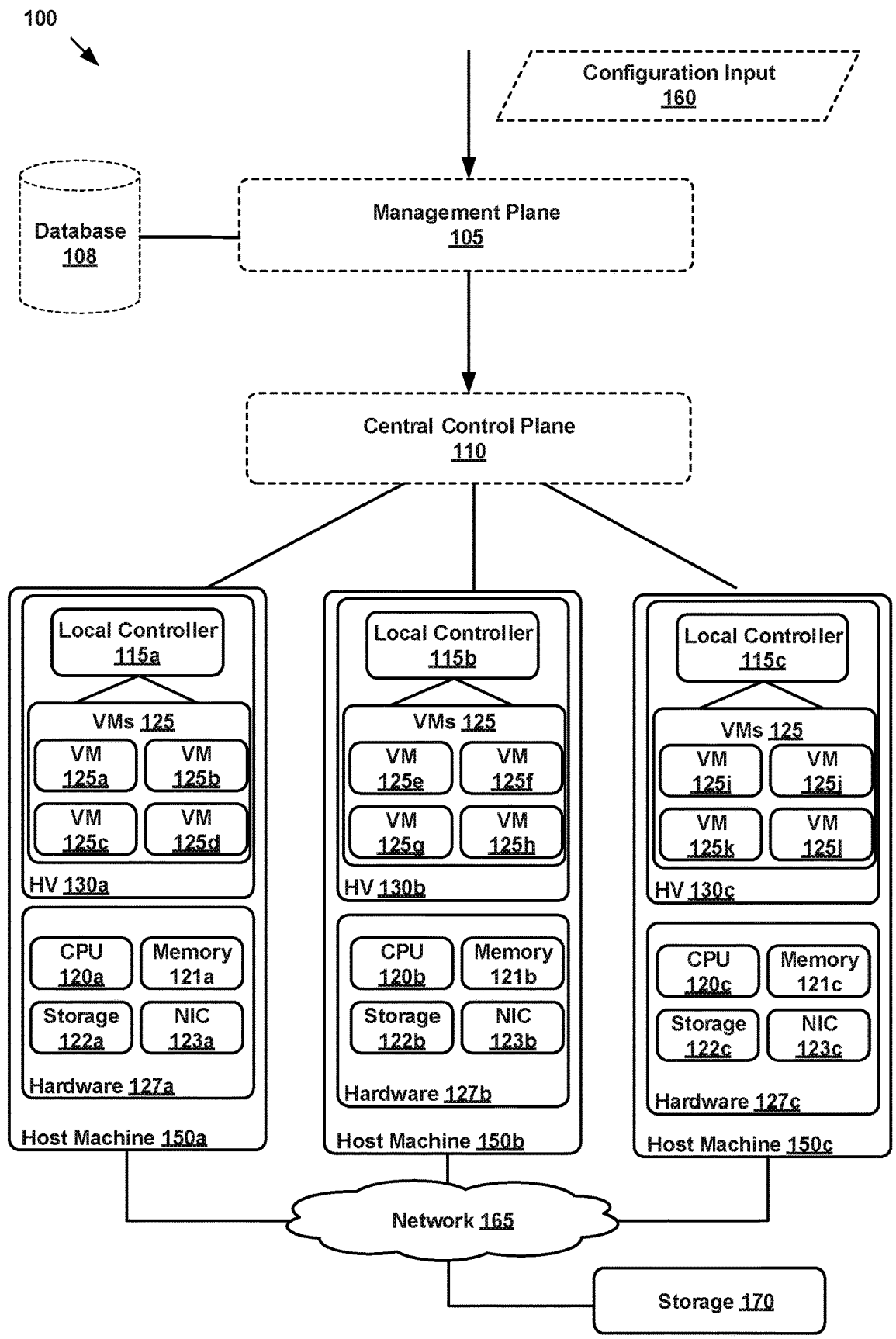
FIG. 1 illustrates an example block diagram of a network control system for a virtual network, according to one example embodiment.

FIG. 1 is a block diagram of a network control system 100 including a management plane 105, a central control plane (CCP) 110, a database 108 and multiple local controllers (also called the local control plane (LCP)) 115a, 115b, and 115c that operate on host machines ("hosts") 150a, 150b, and 150c, respectively, which are physical computing devices that support the execution of virtual machines (VMs) 125a-125l (collectively referred to as VMs 125 and individually referred to as VM 125). Although certain aspects herein are described with respect to VMs, it should be noted that the same techniques may be applied to other types of VCIs. The term "VCI" may refer to VMs, containers, Docker containers, data compute nodes, isolated user space instances, namespace containers, and the like. In addition, the same techniques may also be used by or implemented in relation to physical computing devices.

Hosts 150a-150c (collectively referred to as hosts 150 and individually referred to as host 150) are typically on server grade hardware platforms ("hardware"), such as hardware 127a-127c, respectively. An example of a server grade hardware platform is the x86 architecture platform. Hosts 150a-150c may be geographically co-located servers on the same rack or on different racks in any location within a data center. Each of hosts 150a-150c is configured with a virtualization layer, referred to herein as a hypervisor (also referred to as HV). Each of hypervisors 130a-130c abstracts processor, memory, storage, and networking resources of a corresponding hardware platform 127a-127c into multiple virtual machines 125. VMs 125 on the same host 150 may use any suitable overlaying guest operating system(s) and run concurrently with the other VMs 125.

Hypervisor 130 architecture may vary. In some aspects, hypervisor 130 is installed as system level software directly on the hosts 150 (often referred to as a "bare metal" installation) and conceptually interposed between the physical hardware and the guest operating systems executing in VMs 125. Alternatively, hypervisor 130 may conceptually run "on top of" a conventional host operating system in the server. In some implementations, hypervisor 130 may comprise system level software as well as a privileged VM machine (not shown) that has access to the physical hardware resources of the host 150. In such implementations, a virtual switch, virtual tunnel endpoint (VTEP), etc., along with hardware drivers, may reside in the privileged VM.

Hardware platform 127 of each host 150 includes components of a computing device such as one or more processors (CPUs) 120, a system memory 121, a storage system 122, a network interface (referred to in FIG. 1 as "NI") 123, a host bus adapter (HBA) (not shown), and other I/O devices such as, for example, a mouse and keyboard (not shown). Processor 120 is configured to execute instructions such as executable instructions that perform one or more operations described herein. The executable instructions may be stored in memory 121 and in storage system 122. Network interface 123 enables host 150 to communicate with other devices via a communication medium, such as network 165. Network interface 123 may include one or more network adapters or ports, also referred to as Network Interface Cards (NICs), for connecting to one or more physical networks. Network 165 may be a local area network ("LAN"), a wide area network ("WAN"), or a network of networks, such as the Internet.

Memory 121 is hardware for allowing information, such as executable instructions, configurations, and other data, to be stored and retrieved. Memory 121 is where programs and data are kept when processor 120 is actively using them. Memory 121 may be volatile memory or non-volatile memory. The HBA of a host 150 couples the host to one or more external storages, such as storage 170, which may be a storage area network (SAN) or a distributed virtual SAN. Other external storages that may be used include a network-attached storage (NAS) and other network data storage systems, which may be accessible via network interface 123. Storage system 122 represents persistent storage device(s). Storage 122 may be one or more hard disks, flash memory modules, solid state disks, and/or optical disks. Data on storage disks of storage 122 may be organized into blocks, and each block on storage system 122 may be addressable. Although storage 122 is shown as being local to host 105, storage 122 may be external to host 150, such as by connection via the host 150's HBA. In addition, storage systems 122a-122c may be used as part of a storage virtualization platform, such as virtual SAN (VSAN).

Hypervisors 130a-130c abstract processor, memory, storage, and/or networking resources of hosts 150a-150c, respectively, into multiple VMs 125a-1251, 125e-12h, and 125i-125l that can run side-by-side on the same hosts 150a-150c. That is, the virtualization software partitions physical hosts 150a-150c into multiple secure and portable VMs 125. Each VM 125 may represent a complete virtual system—with virtual processors, virtual memory, virtual networking interface, virtual disk storage, and its own BIOS. For example, each VM 125 comprises a software-based virtual network adaptor (not shown), also referred to as a virtual network interface card (VNIC) that is logically connected to instantiations of the control plane (e.g., local controllers 115a-115c) running on host machines 150a-150c and provides network access for the VM 125. Each VM 125's VNIC is typically connected to a corresponding controller 115 through a virtual switch.

A shown, network control system 100 also includes database 108, management plane 105, central control plane (CCP) 110, which are representations of SDN software applications or components that are configured to be used for implementing one or more logical network topologies for connecting a number of endpoints, such as VM 125, within network control system 100. Though shown as single entities, as further described in relation to FIG. 2, it should be understood that database 108, management plane 105, and CCP 110 may be implemented as distributed or clustered applications or components. For example, management plane 105 may include multiple computing devices that implement management plane functions, and a CCP 110 may include multiple central (or distributed) controller computers, virtual machines, containers, or processes that implement CCP functions. An example of a computing device may include a VM 125 executing on a host 150. In such an example, multiple VMs 125 running on the same or different hosts 150 may implement management and/or control plane functions.

In certain aspects, management plane 105 is responsible for receiving network configuration input 160 through an interface (e.g., an application programming interface or user interface). For example, users (e.g., network administrators) may input network configuration data through a user interface such as a command-line interface or graphical user interface. Network configuration input may, for example, comprise configuration data indicative of how multiple endpoints, such as VM 125, running on different hosts 150 may be connected through a logical Layer-2 or overlay network. More specifically, in certain aspects, each logical network configuration for each logical network includes data defining one or more endpoints and the connections between the endpoints. For example, network configuration input 160 may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc.

Management plane 105 may be configured to store network configuration input 160 in a database 108 that is stored in storage (e.g., storages 122a-122c and 170, etc.). In the aspects described herein, database 108 is a distributed database in that different replicas or instances of database 108 are stored in multiple different data stores, such as storages 122a-122c and 170, in a distributed manner. Each instance of database 108 is structured and managed by a corresponding instance of a distributed database server (DBS). A DBS refers to a software program that is primarily configured to structure and manage a database. Managing a database, for example, includes entering and retrieving information from the database. In addition to being distributed, database 108 described herein is also strongly consistent. In other words, a write operation to any one instance of database 108 is applied to all instances of database 108. As a result of this, a read operation to any instance of database 108 retrieves the same data at all times.

Based on network configuration input 160, management plane 105 generates desired state data that specifies how the logical network should be implemented in the physical infrastructure. CCP 110 then updates/implements the logical network based on the desired state information through local controllers 115. For example, CCP 110 is responsible for managing and maintaining information about virtual machines, virtual switches, virtual routers, etc. implemented on host machines. Further, CCP 110 is responsible for configuring physical network elements implemented by host machines 150a-150c to ensure that the defined logical network topologies and policies are properly implemented. When users provide configuration changes (e.g., creating or deleting logical entities, modifying properties of logical entities, changing relationships between logical entities, etc.), the changes to the desired state are distributed as updates to CCP 110. Local controllers 115 are responsible for translating data received from CCP 110 into configuration data formatted for their respective VMs 125. In some embodiments, the local controller is a daemon that operates in the virtualization software of the host machine.

Figure 2:
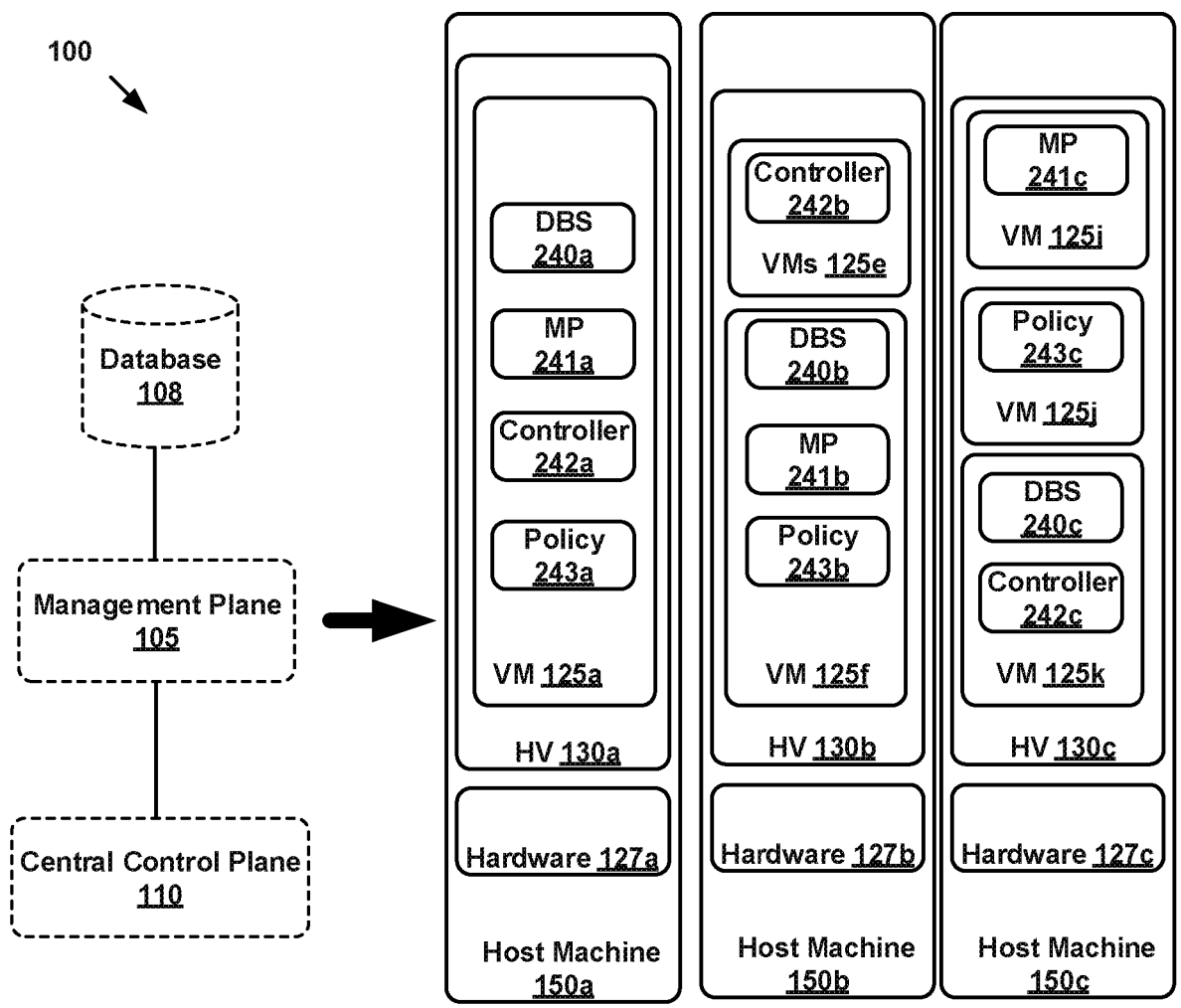
FIG. 2 illustrates an example block diagram of a network control system including a database, a management plane, and a central control plane, according to one example embodiment.

FIG. 2 illustrates an example block diagram of a network control system 100 including database 108 (e.g., a data store), management plane 105, and CCP 110, each of which is a distributed application or component in the example of FIG. 2. More specifically, two or more processes running on different VMs 125 on the same or different hosts 150 may implement the functionality of a certain application or manage a certain component associated with network control system 100. FIG. 2 illustrates an example of a number of processes running on different VMs for implementing the functions of management plane 105 and CCP 110 as well as managing the database application 108

FIG. 2 shows DBS 240a, DBS 240b, and DBS 240c running on VM 125a of host 150a, VM 125f of host 150b, and VM 125k of host 150c, respectively. Each DBS 240 is an instance of a distributed DBS and runs as a process that is configured to structure and manage a corresponding instance of database 108. Management processes (MPs) 241a, MP 241b, and MP 241c run on VM 125a, VM 125f, and VM 125i, respectively, to implement the functions of management plane 105. Similarly, controller process (controller) 242a, controller 242b, and controller 242c run on VM 125a, VM 125e, and VM 125k, respectively, to implement the functions of CCP 110.

Note that processes may be executed separately by separate VMs or together in one VM. For example, VM 125a runs multiple processes, DBS 240a, MP 241a, controller 242a, and policy 243a, associated with different distributed applications. In certain cases, VM 125a may be referred to as a unified appliance. On the other hand, VM 125e, which may be referred to a controller VM, only runs a controller 242b. Also, VM 125f, which may be referred to as a manager VM, runs DBS 240b, MP 241b, and policy 243b. As shown, one or more of the processes may also be executed separately by different VMs, such as VM 125e, which only executes controller 242b, and VM 125i, which only executes MP 241c, etc. One of ordinary skill in the art recognizes that FIG. 2 only illustrates one example of how database 108, MP 105, and CCP 110 can be stored or executed in a distributed manner. Note that policies 243 refer to processes associated with a distributed policy application (not shown). In one example, the distributed policy application is configured to provide a graphical user interface (GUI) to a user to allow the user to specify the user's intent with respect to networking. security, and availability configurations of network control system 100. Once the user inputs the user-intent, the distributed policy application then configures management plane 105 to realize the user-intent.

With a distributed application, each of the multiple processes that implement the functions of the application is configured with the same logic. In other words, any of the multiple processes of a distributed application is able to handle workload associated with the application. Therefore, workload is typically divided among the multiple processes. The sharing of workload in such a distributed manner provides many advantages, including fault tolerance. For example, if an underlying computing device associated with one of the multiple processes of a distributed application fails, the distributed application still functions because the other processes on other computing devices are still operating. To illustrate this with an example, in the case of management plane 105 in FIG. 2, if VM 125a fails, thereby, rendering MP 241a unavailable, management plane 105 would still function because MP 241b and 241c are still operating.

In order for an application to operate in a distributed manner, it is important that the corresponding processes are clustered such that each of them is able to discover, communicate, and share workloads with the other processes. Further, in a system with multiple distributed applications that work together to accomplish a task, it is important for processes associated with one distributed application be able to discover and communicate with processes of the other distributed applications. For example, in order for an administrator to create a functioning network control system, such as network control system 100 of FIG. 2, processes associated with MP 105 should be able to discover and communicate with processes associated with database 108, and CCP 110. Clustering processes of one or more distributed applications, such that the processes are able to efficiently and securely discover, trust, and communicate together while being synchronized, however, is a challenge.

Accordingly, certain aspects described herein relate to systems and methods for efficiently and securely configuring clusters of processes that are able to discover, trust, and communicate together while being synchronized. The aspects described herein provide a cluster manager ("CM") that is configured to be a distributed application or software program for configuring and managing clusters within a system, such as network control system 100 of FIG. 2. The CM is configured to enable processes associated with one or more distributed applications to efficiently and securely discover, trust, communicate, and synchronize together by utilizing local trust stores (e.g., Java KeyStore files) as well as a strongly consistent database.

In certain aspects, the CM is installed on each VM 125 that is instantiated by, for example, an administrator to be a part of a clustered system, such as network control system 100. When a new VM 125 is instantiated, its corresponding CM performs cluster configuration operations for clustering the VM and its processes. One of ordinary skill in the art recognizes that clustering VMs is a step-by-step process such that, initially, a one-VM cluster is created and then additional VMs are added to the one-VM-cluster, thereby, creating a two-VM-cluster, a three-VM-cluster, and so on. FIGS. 3-10 illustrate cluster configuration operations performed to create multi-VM clusters in steps. Note that FIGS. 3-10 describe cluster configuration operations performed by CMs for clustering VMs and processes of network control system 100 shown in FIGS. 1 and 2. However, CMs, as described herein, may be used for clustering any type of computing device, apparatus, or node (e.g., virtual or physical) in any type of system. In other words, as further described in relation to FIGS. 9-10, the cluster configuration operations performed by CMs are decoupled from and not dependent on the type of node, processes, or system. Note that a virtual node may be any type of VCI.

Figure 3:
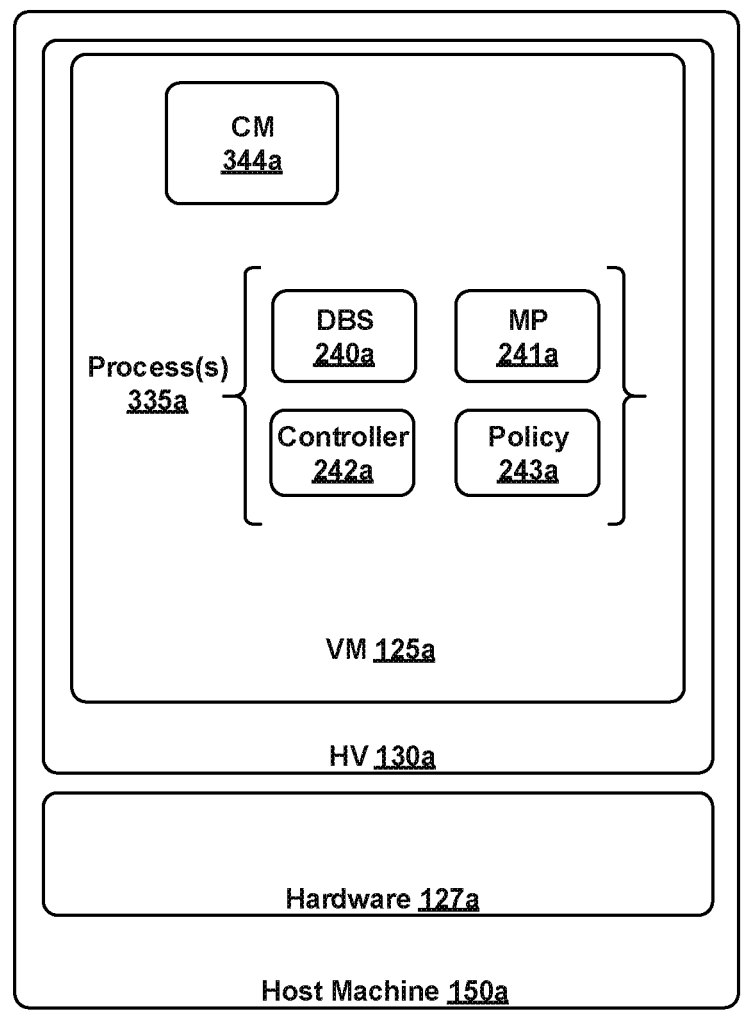
FIG. 3 illustrates an example virtual machine (VM) that is configured with a cluster manager (CM), according to one example embodiment.

FIG. 3 illustrates an example VM 125a that is configured with a CM. As shown, CM 344a is a process that runs on VM 125a, which is configured with a number of processes 335a, including DBS 240a, MP 241a, controller 242a, and policy 243a.

When VM 125a boots up, CM 344a is configured to operate differently depending on whether or not it is the first time VM 125a is booting up (e.g., whether it is VM 125's first boot). Booting up refers to a process of starting VM 125a from an offline state and making it available to be clustered and perform computing operations. When VM 125a is first instantiated and becomes operational, CM 344a is configured to determine that it is VM 125a's first boot, based on which CM 344a performs a set of operations to allow VM 125a to be clustered.

As VMs 125 are configured to be clustered when they first boot up, if CM 344a determines that it is not VM 125a's first boot, it means that VM 125a must have been previously clustered. In such cases, CM 344a performs a set of operations to allow VM 125a to synchronize with and rejoin an existing cluster. For example, CM 344a locates and uses a DB connection info file to connect with database 108 and obtain the latest cluster configuration information associated with an existing cluster, which would allow VM 125a and its processes to join the existing cluster. A VM 125 is configured with a DB connection info file upon VM 125's first boot. The DB connection info file enables a VM 125 to communicate with distributed database 108 and synchronize with the latest cluster configuration, which is stored in database 108. A DB connection info file comprises information relating to the DBSs that are part of a DBS cluster, where each of the DBSs may be configured to manage a different instance of database 108. For example, for each DBS in a DBS cluster, the DB connection info file may indicate an IP address associated with a VNIC of a VM 125 that runs the DBS as well as a port number that the DBS is coupled to. Using a DB connection info file, all VMs in a cluster are able to determine how to communicate with the different DBSs in the cluster (e.g., to what IP addresses and port numbers to send packets to).

Figure 4:
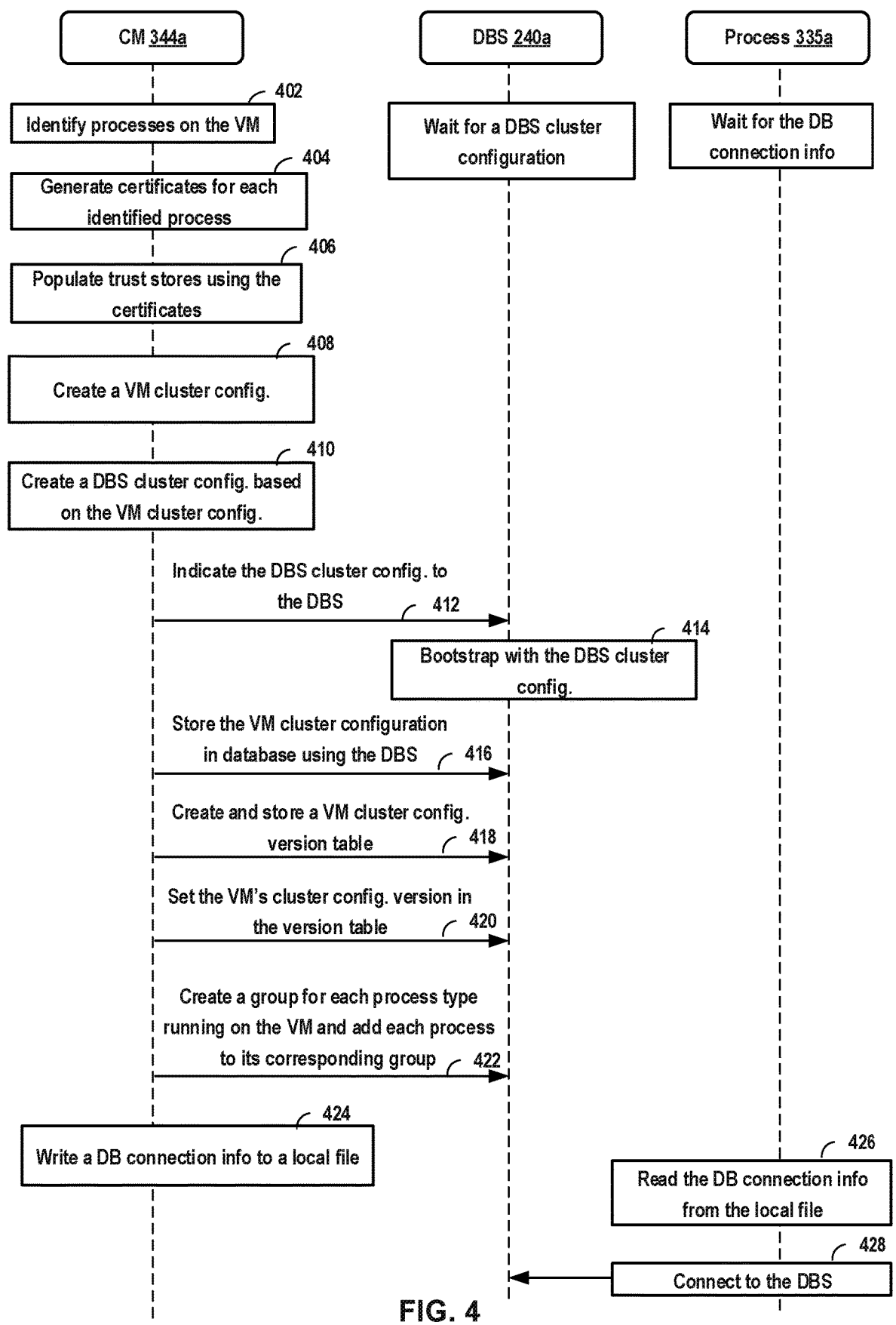
FIG. 4 illustrates example cluster configuration operations performed by the CM of FIG. 3, according to certain embodiments described herein.

In certain aspects, to determine whether it is VM 125a's first boot, CM 344a is configured to examine the existence of certain files, such as a barrier file, in a certain directory location associated with the local storage of VM 125a. This is because if VM 125a has been booted before, CM 244a must have configured VM 125a with a barrier file. If a barrier file does not exist it means that it is VM 125a's first boot; otherwise, it means that VM 125a has been booted before. If, however, it is not VM 125a's first boot, FIG. 4 illustrates example cluster configuration operations 400 performed by CM 344a of VM 125a of FIG. 3. Operations 400 are performed by CM 344a upon determining that it is the first boot of VM 125a. More specifically, blocks 402-406 are performed by CM 344a to bootstrap VM 125a, which prepares VM 125a for clustering. For example, prior to clustering VM 125a, CM 344a first identifies processes 335a and then ensures that processes 335a are able to trust each other and securely communicate by using security certificates and local trust stores, as described below. Once blocks 402-406 are performed, CM 344a proceeds to performing blocks 408-412 and 416-424 to cluster VM 125a and DBS 240a.

At block 402, CM 344a identifies processes 335a that VM 125a is configured to execute. In certain aspects, CM 344a identifies processes 335a based on the type of VM 125a. For example, in such aspects, if VM 125a is a unified appliance, then CM 344a is configured to determine that processes 335a include a DBS, an MP, a controller, and/or a policy, which are shown in FIG. 3 as DBS 240a, MP 241a, controller 242a, and policy 243a, respectively. In other examples (not shown in FIG. 3), if a VM is a manager appliance, it may only include an MP, a DBS, and a policy and if the VM is a controller appliance, it may only include a controller. In certain aspects, CM 344a is able to determine the type of VM 125a based on a file that is created and written to the local storage associated with VM 125a during the instantiation of VM 125a. In such aspects, the file indicates the type of VM 125a.

In certain other aspects, after VM 125a is instantiated, processes 335a are configured to register themselves with CM 344a, thereby, enabling CM 344a to identify processes 335a. Once each one of processes 335a is identified, CM 344a moves to block 404 to enable processes 335a to trust each other and securely communicate. Although various techniques may be used for this purpose, block 404 describes the use of the transport layer security (TLS), which refers to a set of cryptographic protocols designed to provide communications security over a computer network.

At block 404, CM 344a generates a key-pair (e.g., public and private key pair) and a security certificate ("certificate") for each identified process. In certain aspects, a process's certificate (e.g., a X.509 certificate) comprises a public key as well as an indication of the identity of the corresponding process. The certificate is either signed by a certificate authority or is self-signed by the corresponding process. Certificates are used to enable processes 335a to trust or authenticate each other. For example, each one of processes 335a may comprise a trust store for storing certificates of other processes that the process trusts. As such, if, for example, the trust store of a first process stores the certificate of a second process, the first process is able to determine that it can trust the second process. Similarly, by accessing its trust store and finding the first process's certificate, the second process is able to trust the first process as well. Therefore, by accessing its trust store, each process is able to determine which processes it can trust based on the certificates that are stored in the trust store.

Note that although block 404 describes a certificate being generated by CM 344a, in certain aspects, it may be the processes themselves that generate their respective certificates. In such aspects, each process then writes its certificate to a location in VM 125a's file system that is known to the CM.

At block 406, CM 344a populates the trust stores of processes 335a with each other's certificates. In certain aspects, CM 344a creates a trust store for each one of processes 335a. In other aspects, each one of processes 335a creates its own trust store. A trust store, in certain aspects, may be a Java KeyStore file that is stored in the local storage associated with VM 125a. CM 344a then populates the trust store of each of processes 335a with the other processes' certificates. As an example, CM 244a may populate the trust store of MP 241a with certificates of DBS 240a, controller 242a, and policy 243a. This enables MP 241a to trust and securely communicate with DBS 240a, controller 242a, and policy 243a using TLS authentication processes.

After blocks 402-406 of operations 400 are performed, VM 125a may be referred to as having been bootstrapped. Once VM 125a is bootstrapped, if one of processes 335 running on VM 125a is a DBS, which is the case in the example of FIG. 3, CM 344a is configured to move to block 408 in order to create a VM cluster as well as a DBS cluster. If a DBS is not one of the processes running on a VM, however, the corresponding CM waits to receive a request from an administrator to join an existing cluster, as further described below. Note that, in certain aspects, after VM 125a has been bootstrapped once, it is not able to be bootstrapped again. In such aspects, to redo VM 125a's bootstrap, a REST API call may be made to reset VM 125a. Resetting VM 125a, in such aspects, includes deleting all configuration information and data associated with the first boot and bootstrapping of VM 125a.

At block 408, CM 344a creates a VM cluster configuration for VM 125a. A VM cluster configuration (also referred to as a "management cluster configuration" or just "cluster configuration") refers to the configuration of a cluster of VMs (also referred to as a VM cluster). For example, in the aspects of FIGS. 1-10, where VMs 125 are appliances of network control system 100, cluster configuration refers to the configuration of a cluster of VMs 125. In certain aspects, the VM cluster configuration is stored as a JSON file that comprises a cluster configuration version as well as additional information about each VM in the cluster. In certain aspects, CMs 344 are the sole creator and consumer of cluster configuration information and are configured to keep the cluster configuration up to date as VMs 125 are added or removed from the VM cluster. For each VM in the cluster, the cluster configuration comprises information including a universally unique identification (UUID), an application programing interface (API) IP address and a port number associated with the VM, a list of processes that the VM is configured with, and a status of each VM.

By performing block 408 of operations 400, CM 344a creates a one-VM cluster configuration, which includes cluster configuration information associated with VM 125a. The VM cluster configuration of VM 125a comprises the UUID of VM 125a, the API IP address and port number associated with VM 125a, a list of processes 335 as well as information associated with each of processes 335, and a status of VM 125a. An API IP address is used for communicating with VM 125a through an API server. For example, a representational state transfer (REST API) server (not shown) running on VM 125a binds to this IP address for communicating with other REST API servers running on other VMs 125. VM 125a's port number identifies a virtual port that VM 125a uses for sending and receiving packets.

The VM cluster configuration also comprises a list of processes 335a including DBS 240a, MP 241a, controller 242a, and policy 243a, as well as information associated with each of processes 335. Such information may include UUIDs associated with processes 335a, if available, IP addresses and port numbers of processes 335a, and the certificates of processes 335a. The VM cluster configuration also indicates the status of VM 125a in the cluster by indicating whether VM 125a is joining the cluster ("joining"), has joined the cluster ("joined"), is being removed, or has been removed.

After creating a VM cluster configuration for initiating a VM cluster, CM 344a proceeds to block 410 to create a DBS cluster configuration for initiating a DBS cluster. A DBS cluster enables database 108 to operate in a distributed manner. As described in further detail below, CMs 344 rely on the strongly consistent database 108 for storing information that is used in relation to the cluster configuration operations described herein for creating a two-VM cluster, a three-VM cluster, etc. For example, the information may include the latest cluster configuration that allows all VMs 125 in a VM cluster to be in synchronization. The information may also include a cluster configuration version table, which each VM 125 of a VM cluster is configured to use to determine whether the VM 125 is in synchronization with the latest cluster configuration information. Further, the information may include group directory tables, group membership tables, and heartbeat tables associated with all the processes in the cluster. These tables indicate the latest status of one or more of processes 335, such as whether a process 335 has failed or is still executing.

At block 410, CM 344a creates a DBS cluster configuration or layout based on the VM cluster configuration created at block 408. The DBS cluster configuration creates a DBS cluster to allow database 108 to function in a distributed manner. A DBS cluster configuration identifies each DBS that is part of the DBS cluster. At this point in the cluster configuration operations, the DBS cluster configuration identifies DBS 240a as the only member of the cluster. However, additional DBSs 240 running on other VMs 125 (e.g., VMs 125f and 125k) may later join the DBS cluster.

At block 412, CM 344a indicates the DBS cluster configuration to DBS 240a. As shown in FIG. 4, when VM 125a is instantiated, DBS 240a is configured to wait for a DBS cluster configuration to be received from CM 344a. Once DBS 240a receives the DBS cluster configuration, it is able to bootstrap itself using the DBS cluster configuration.

At block 414, DBS 240a bootstraps itself using the DBS cluster configuration. In other words, DBS 240a uses the DBS cluster configuration to configure itself such that it is able to operate as a member of a DBS cluster associated with a VM cluster that includes VM 125a. Once DBS 240a is bootstrapped, it is able to receive information from CM 344a and store it in storage.

At block 416, CM 344a stores the VM cluster configuration in database 108 through DBS 240a. Once the VM cluster configuration is stored in database 108, it becomes accessible to other VMs 125 that may later join the cluster.

At block 418, CM 344a creates and stores a VM cluster configuration version table in database 108 through DBS 240a. The VM cluster configuration version table stores the cluster configuration version for each VM 125 in the cluster. For example, for the one-VM cluster, the newly created VM cluster configuration version table stores the cluster configuration version associated with VM 125a. For example, when VM 125a's cluster configuration version in the table is set to "1," it means that VM 125a has the certificates of all processes 335 associated with cluster configuration version "1," which include processes 335a. If, at a later time, VM 125a's cluster configuration version in the table is set to "4," it means that VM 125a has the certificates of all processes 335 in the cluster configuration version 4.

The cluster configuration version table is used for synchronizing VMs 125 when the cluster configuration changes. In certain aspects, in addition to the cluster configuration version, the cluster configuration version table may also store the complete cluster configuration that VM 125a is synchronized with. By examining the complete cluster configuration in the table, VMs 125 in a cluster are able to identify the differences between the latest cluster configuration and the cluster configuration that they are synchronized with.

At block 420, CM 344a sets VM 125a's cluster configuration version to "1" in the cluster configuration version table.

At block 422, CM 344a creates a group for each of processes 335a, except for DBS 240a, and adds processes 335a to their respective groups. For example, CM 344a creates an MP group, to which CM 344a adds MP 241a as a member. CM 344a also creates a controller group, to which CM 344a adds controller 242a as a member, and a policy group, to which CM 344a adds policy 243a as a member. In one example, creating a group refers to creating a group membership table for each type of process 335 and adding a corresponding process 335 running on VM 125a to the group membership table as an entry. For example, creating an MP group refers to creating an MP group membership table to which CM 344a adds MP 241a as a member. In certain aspects, CM 344a also creates a group directory table that indicates the different groups that have been created for different types of processes 335a. For example, a group directory table may include an MP group, a controller group, and a policy group.

At block 424, CM 344a writes DB connection information to a local file in the local storage associated with VM 125a. As discussed, a DB connection information file comprises information relating to all the DBSs that are part of the current DBS cluster. In this example, only DBS 240a is part of the DBS cluster at this point. As such, the DB connection information may, for example, indicate an IP address associated with a VNIC of VM 125a that runs DBS 240a as well as a port number that DBS 240a is coupled to. This allows other processes 335a to communicate with DBS 240a using DBS 240's port number. For example, MP 241a is able to send data packets to DBS 240a based on information in the DB connection info file.

At block 426, one or more of processes 335a, other than DBS 240a, read the DB connection information from the local file. When VM 125a is instantiated, processes 335a, other than DBS 240a, are configured to wait until DB connection information is written to the local file, whose location is known to the processes. For example, MP 241a, controller 242a, and policy 243a may periodically check the local file to determine whether any DB connection information is written to the file. After reading the DB connection information from the file, MP 241a, controller 242a, and policy 243a are configured to use it to connect with DBS 240a.

At block 428, one or more of processes 335a connect to DBS 240a. After connecting to DBS 240a, each one of MP 241a, controller 242a, and policy 243a is configured to periodically indicate its status by writing to database 108 through DBS 240a. As an example, each process may periodically update a table (e.g., heartbeat table) to indicate that it is still executing and has not failed.

Figure 5:
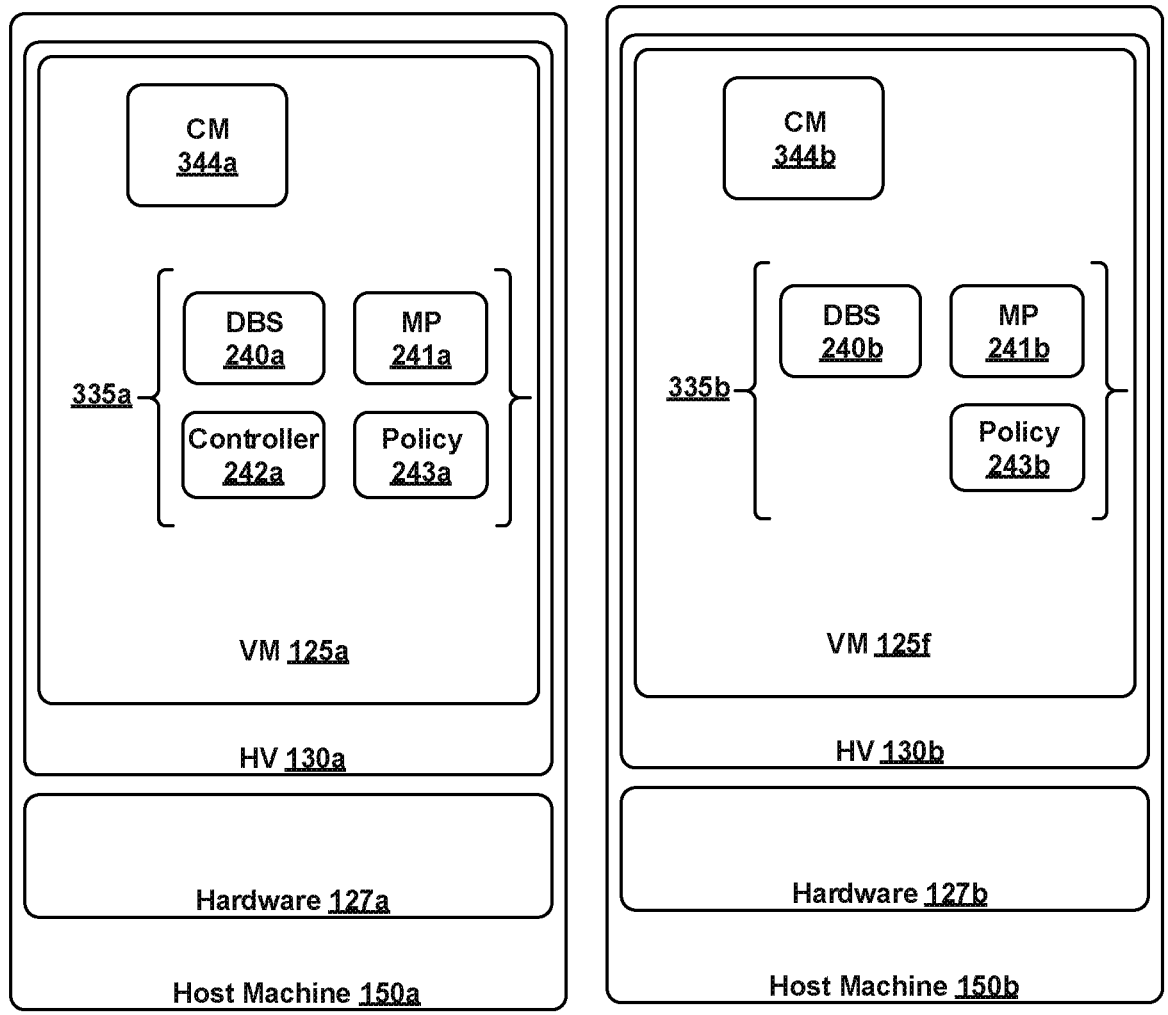
FIG. 5 illustrates two example VMs that are clustered together with the cluster configuration operations of FIGS. 6A-6B, according to certain embodiments described herein.

At this point, VM 125a is part of a one-VM cluster. As such, if VM 125a temporarily fails and restarts, CM 344a is able to determine that the DB connection information file has already been written to, which indicates to CM 344a that VM 125a has already been clustered. Once a one-VM cluster is created, additional VMs 125 can be added to the cluster. FIG. 5 illustrates an example of a second VM that an administrator may add to the one-VM cluster.

FIG. 5 illustrates VM 125a executing on host machine 150a as well as VM 125f executing on host machine 150b. As described above, VM 125a is already part of a one-VM cluster. An administrator is able to create a two-VM cluster by causing or requesting VM 125f to join the one-VM cluster, as further described in relation to FIGS. 6A-6B. VM 125f comprises CM 344b as well as processes 335b, which include DBS 240b, MP 241b, and policy 243b. Note that processes 335b are merely exemplary.

Figure 6A:
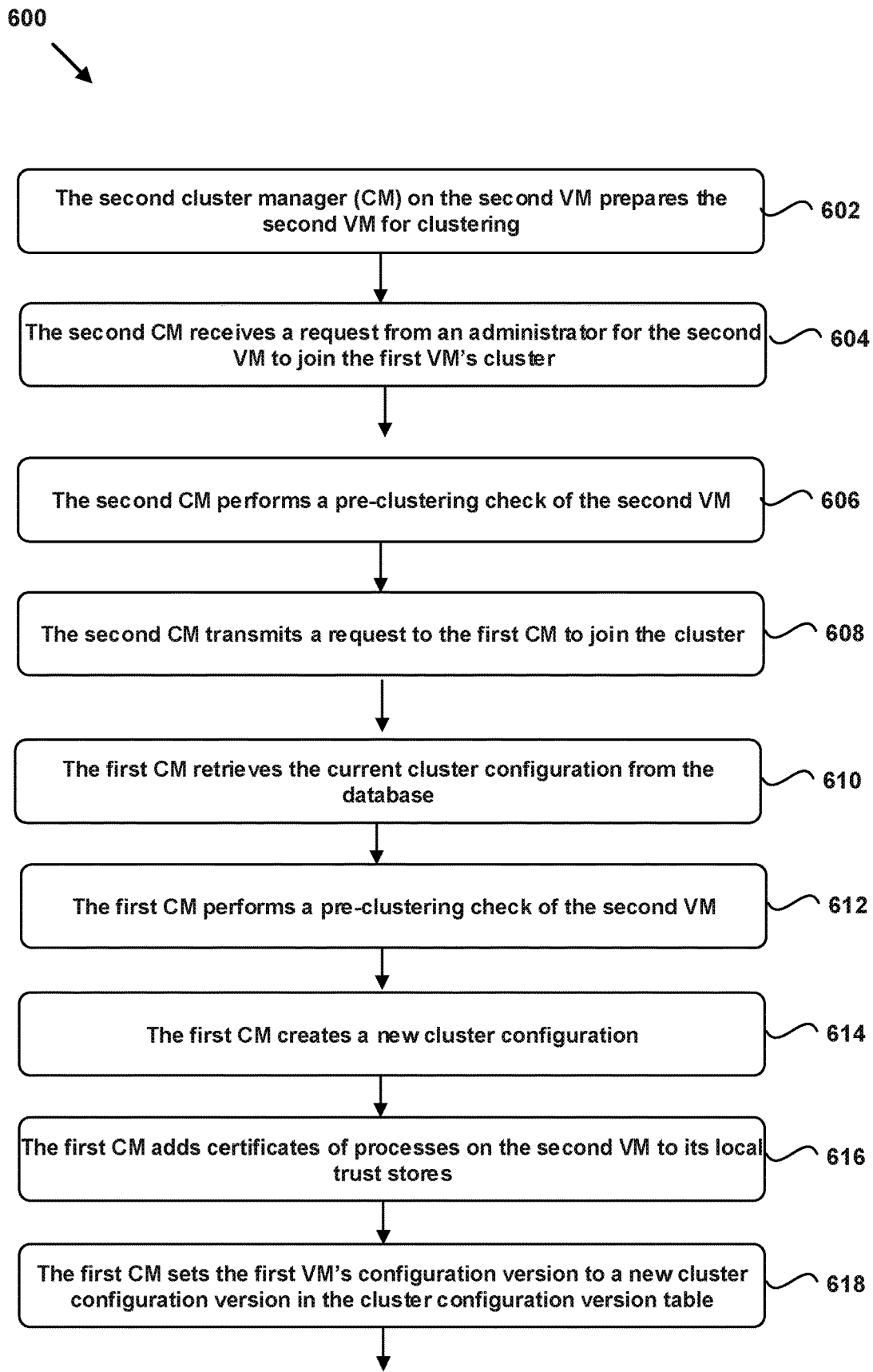
FIGS. 6A-6B illustrate example cluster configuration operations performed by the CMs of the VMs in FIG. 5, according to certain embodiments described herein.
Figure 6B:
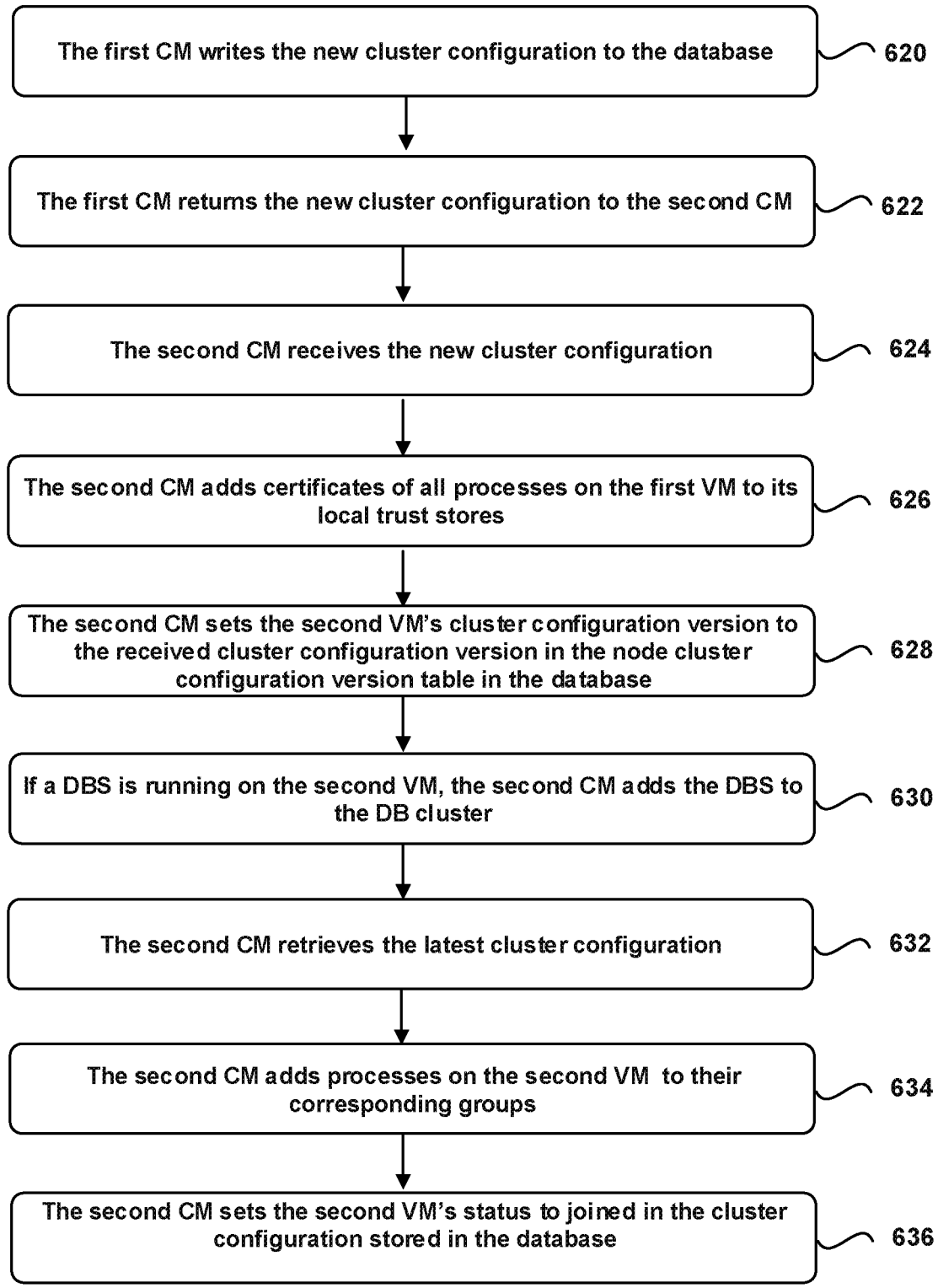

Operations 600 of FIGS. 6A-6B are described herein with reference to a first VM, having a first CM, and a second VM, having a second CM. The first VM refers to a VM that is already part of a one-VM cluster. The second VM refers to a VM that is being added to a one-VM cluster. Operations 600 describe cluster configuration operations performed by the first CM and the second CM for the second VM to be added to the one-VM cluster of the first VM. In the example of FIG. 5, the first VM refers to VM 125a and the first CM refers to CM 344a while the second VM refers to VM 125f and the second CM refers to CM 344b. When the second VM is first instantiated, the second CM is configured to perform a set of operations to prepare the second VM to join a cluster. Such operations are described in steps 602-608 of operations 600.

At block 602, the second CM prepares the second VM for clustering. In certain aspects, the operations performed for preparing the second VM depends on whether the second VM is configured with a DBS. If the second VM is not configured with a DBS, the second CM performs a set of operations similar to operations 402-406 of FIG. 4 to bootstrap the second VM. Such operations may involve identifying the processes executing on the second VM, generating certificates for the processes, and populating the processes' trust stores with the certificates. If the second VM is configured with a DBS, the second CM performs a set of operations similar to operations 402-412 and 416-424. As described in relation to FIG. 4, such operations result in creating a one-VM cluster that includes the second VM as well as a DBS cluster comprising the DBS that executes the second VM.

In the example of FIG. 5, because VM 125f is configured with DBS 240b, CM 344b creates a one-VM cluster for VM 125f. Once VM 125f is prepared for clustering, an administrator may trigger a set of operations to add VM 125f to the one-VM cluster of VM 125a.

At block 604, the second CM receives a request from an administrator for the second VM to join the first VM's cluster. For example, an administrator executes a command on a command line interface (CLI) associated with CM 344b that indicates a request for VM 125f to join VM 125a's cluster. In certain aspects, the command causes authentication information to be passed to CM 344b that enables both VM 125a and VM 125f to authenticate each other. In certain aspects, the authentication information is sent to CM 344b along with the command.

The authentication information may comprise an API certificate thumbprint of VM 125a as well as a username and password associated with VM 125a. The authentication information also comprises an IP address associated with VM 125a. In certain aspects, the IP address may be an API IP address associated with a REST API server executing on VM 125a. Note that an administrator is able to retrieve the API certificate thumbprint of VM 125a using a CLI associated with CM 344a.

At block 606, the second CM performs a pre-clustering check of the second VM. For example, once the administrator runs the command on the CLI associated with CM 344b, CM 344b performs a pre-clustering check to ensure that VM 125f is not already a member of an existing multi-VM cluster and also is not in use. If VM 125f is part of an existing multi-node cluster, CM 344b ends the cluster configuration operations.

At block 608, the second CM transmits a request to the first CM to join the first VM's cluster. For example, after performing the pre-clustering check at block 606, CM 344b makes an API request to VM 125a in order to trigger CM 344a to add VM 125f to VM 125a's cluster. In certain aspects, the request comprises information relating to VM 125f such as attributes of VM 125f and a list of processes 335b running on VM 125f as well as information relating to each of processes 335b. The information associated with each of processes 335 comprises, among other things, the certificates of processes 335. In certain aspects, the API request is then received by a node API (NAPI) at VM 125a. NAPI refers to a set of instructions configured to process node/VM level API calls. Once NAPI at VM 125a receives CM 344b's API call, it then processes and forwards the API call to CM 344a via a remote procedure call (RPC).

In certain aspects, prior to transmitting the request, VM 125f makes an API call to an IP address associated with VM 125a in order for VM 125a and VM 125f to authenticate each other. In certain aspects, the API call is a REST API call that is transmitted using a REST API server running on VM 125f to an API IP address of a REST API server running on VM 125*a*. The API call comprises the username and password associated with VM 125*a,* which were previously received when the CLI command was inputted by the administrator. Using the user name and password, VM 125*a* is able to authenticate VM 125*f.* More specifically, if the username and password are correct, VM 125*a* is configured to determine that it can trust VM 125*f.* After authenticating VM 125*f,* VM 125*a* then transmits its API certificate to VM 125*f,* based on which VM 125*f* generates a thumbprint. VM 125*f* then compares the generated thumbprint against the thumbprint it received from the administrator. If the thumbprints match, VM 125*f* is configured to trust VM 125*a* as well. Once VM 125*a* and VM 125*f* authenticate each other, CM 344*b* makes the API request described above.

At block 610, the first CM retrieves the current or latest cluster configuration from the database. For example, CM 344*a* retrieves the latest cluster configuration from database 108 through DBS 240*a.*

At block 612, the first CM performs a pre-clustering check of the second VM. As an example, CM 344*a* determines if VM 125*f* is already a part of a cluster or if VM 125*f* is being used in a certain operation.

At block 614, the first CM creates a new cluster configuration. For example, CM 344*a* creates a new cluster configuration based on the information received as part of the request at block 608. As described above, the information includes attributes of VM 125*f* (e.g., UUID, API IP address, API port number), a list of processes 335*b* running on VM 125*f,* and information relating to each of processes 335*b* (e.g., process type, process UUID, IP address port number associated with the process, the process's certificate). In the newly created cluster configuration, CM 344*a* sets VM 125*f*'s status as "joining" in the cluster configuration. In addition, CM 344*a* increments the cluster configuration's version to version "2."

At block 616, the first CM adds certificates of processes on the second VM to the local trust stores on the first VM. For example, CM 344*a* adds certificates of processes 335*b* to the local trust stores of processes 335*a.* As a result of this, processes 335*a* would be able to trust processes 335*b.* Note that certificates of processes 335*b* were included in the request that was received from CM 344*b* at block 608.

At block 618, the first CM sets the first VM's cluster configuration version to a new cluster configuration version in the cluster configuration version table that is stored in the database. For example, CM 344*a* sets VM 125*a*'s cluster configuration version to "2" in the cluster configuration version table that is stored in database 108. Setting VM 125*a*'s cluster configuration version to "2" indicates that VM 125*a* is synchronized with the latest cluster configuration, whose version is also set to "2."

At block 620, the first CM writes the new cluster configuration to the database. For example, CM 344*a* writes the new cluster configuration created at block 612 to database 108 through DBS 240*a.* Subsequently, CM 344*a* is configured to wait for all VMs that are part of the cluster to be synchronized with the new cluster configuration. Note that in the example used herein, VM 125*a* is the only VM that is part of the cluster at this point. As such, in certain aspects, CM 344*a* may examine the cluster configuration version table, based on which CM 344*a* may determine that VM 125*a,* whose status is set to "joined," is synchronized with the latest cluster configuration because VM 125*a*'s cluster configuration version is also set to "2."

However, in other examples where the cluster includes additional VMs 125, CM 344*a* is configured to determine whether all the VMs in the cluster are synchronized with the latest cluster configuration. In order to make that determination, CM 344*a* is configured to periodically monitor the cluster configuration version table to examine whether each of the VMs with a "joined" status has a corresponding cluster configuration version that is the same as the new cluster configuration's version number.

Note that each CM 344 on each VM 125 in a cluster is configured to run a periodic thread or task to ensure that the corresponding VM 125 is synchronized with the latest cluster configuration. For example, a CM 344 is configured to periodically retrieve the latest cluster configuration from database 108 and compare the latest cluster configuration's version to the version of the cluster configuration that the corresponding VM 125 is already synchronized with. Upon determining that the cluster configuration versions do not match, CM 344 updates its corresponding VM 125's local trust stores with certificates of processes associated with new VMs that have joined the cluster, if any. These certificates are included in the latest cluster configuration that is stored in database 108. Also, if a VM 125 has been removed from the cluster, CM 344 updates local trust stores of its corresponding VM 125 by deleting the removed VM 125's certificates from local trust stores. In certain aspects, CM 344 maintains a temporary local copy of the latest cluster configuration or cluster configuration version table in database 108 in order to identify any changes to the cluster configuration.

Once CM 344 updates the local trust stores of the corresponding VM 125, it is configured to update the corresponding VM 125's cluster configuration version in the cluster configuration version table. This indicates that the corresponding VM 125 is now synchronized with the latest cluster configuration. As each VM 125 synchronizes with the latest cluster configuration, its corresponding CM 344 is also configured to update the VM 125's DB connection info file. For example, if a new VM 125 that has joined the cluster is running a DBS 240, CM 344 of an existing VM 125 updates the existing VM 125's DB connection info file with information relating to the new DBS 240, which may include an IP address associated with a VNIC of the new VM 125 as well as a port number that the new DBS 240 is coupled to.

At block 622, the first CM returns the new cluster configuration to the second CM. For example, CM 344*a* transmits the new cluster configuration to NAPI as a response to the API call that CM 344*a* preciously received from NAPI via an RPC. NAPI then returns the new cluster configuration to CM 344*b* as a response to the API call received from CM 344*b* at block 608.

At block 624, the second CM receives the new cluster configuration from the first CM. For example, CM 344*b* receives the new cluster configuration from CM 344*a.*

At block 626, the second CM adds certificates of all processes associated with the first VM to the second VM's local trust stores. For example, the new cluster configuration comprises certificates of processes 335*a* running on VM 125*a.* CM 344*b* adds those certifications to the local trust stores of processes 335*b.* Note that the certificates associated with VM 125*a* are included in the new cluster configuration that VM 125*f* has received at block 624.

At block 628, the second CM sets the cluster configuration version associated with the second VM to the received cluster configuration's version. For example, CM 344*b* sets the cluster configuration version associated with VM 125*f* to the cluster configuration version of the new cluster configuration that CM 344*a* has received at block 624. In other words, in the example used herein, CM 344b changes the cluster configuration version associated with VM 125f from "1" to "2."

At block 630, if the second VM is running a DBS, the second CM adds the DBS to the DBS cluster. In the example used herein, VM 125f executes DBS 240b, which CM 344b adds to the DBS cluster that was created earlier by CM 344a at block 410 of FIG. 4. Note that prior to adding DBS 240b, the DBS cluster only includes DBS 240a in the example used herein. In order to access the DBS cluster for adding DBS 240b, CM 344b communicates with database 108 through DBS 240a. This is because DBS 240b is not yet clustered and does not have access to database 108. In certain aspects, CM 344b communicates with DBS 240a through REST API calls. Adding DBS 240b to the DBS cluster results in changing the DBS cluster configuration. Note that CMs 344 on all VMs 125 in the cluster are configured to periodically examine whether they are synchronized with the latest DBS cluster configuration. If the second VM is not configured with a DBS, the second CM is configured to proceed to block 632.

At block 632, the second CM retrieves the latest cluster configuration from the database. For example, CM 344b is configured to retrieve the latest cluster configuration by performing a read operation on database 108 (e.g., through DBS 240a or DBS 240b).

At block 634, the second CM is configured to add the processes running on the second VM to their corresponding groups in the database. For example, CM 344b is configured to add each one of processes 335b, except for DBS 240b, to their corresponding groups, if any, in database 108. In the example used herein, processes 335b comprise MP 241b and policy 243b. As such, CM 344b is configured to examine the group directory table in database 108 to determine whether an MP group and a policy group have already been created. Based on that examination, CM 344b is able to determine that those groups have already been created, as described in relation to block 422 of FIG. 4. Accordingly, CM 344b adds MP 241b to the MP group and policy 243b to the policy group. However, in other examples or scenarios, if VM 125f runs a process for which a group has not been created and stored in database 108, then CM 344b creates and stores the group in database 108. CM 344b would then add the process to the newly created group.

At 636, the second CM sets the second VM's status to "joined" in the latest cluster configuration. For example, CM 344b updates the latest cluster configuration by changing VM 125f's status in the latest cluster configuration from "joining" to "joined." CM 344b then stores the updated cluster configuration in database 108.

Once VM 125f has joined the cluster, processes 335a and 335b are able to directly communicate together in a secure way and share workloads. More specifically, prior to VM 125f joining VM 125a's cluster, all communications between VM 125a and VM 125a would be through REST API servers running on the two VMs. However, once the cluster configuration operations described in FIGS. 6A-6B are performed, processes 335a and 335b are able to directly communicate together using the IP address and port number that each process binds to. Once VM 125f is added to the cluster, an administrator may wish to grow the cluster by adding additional VMs 125.

Figure 7:
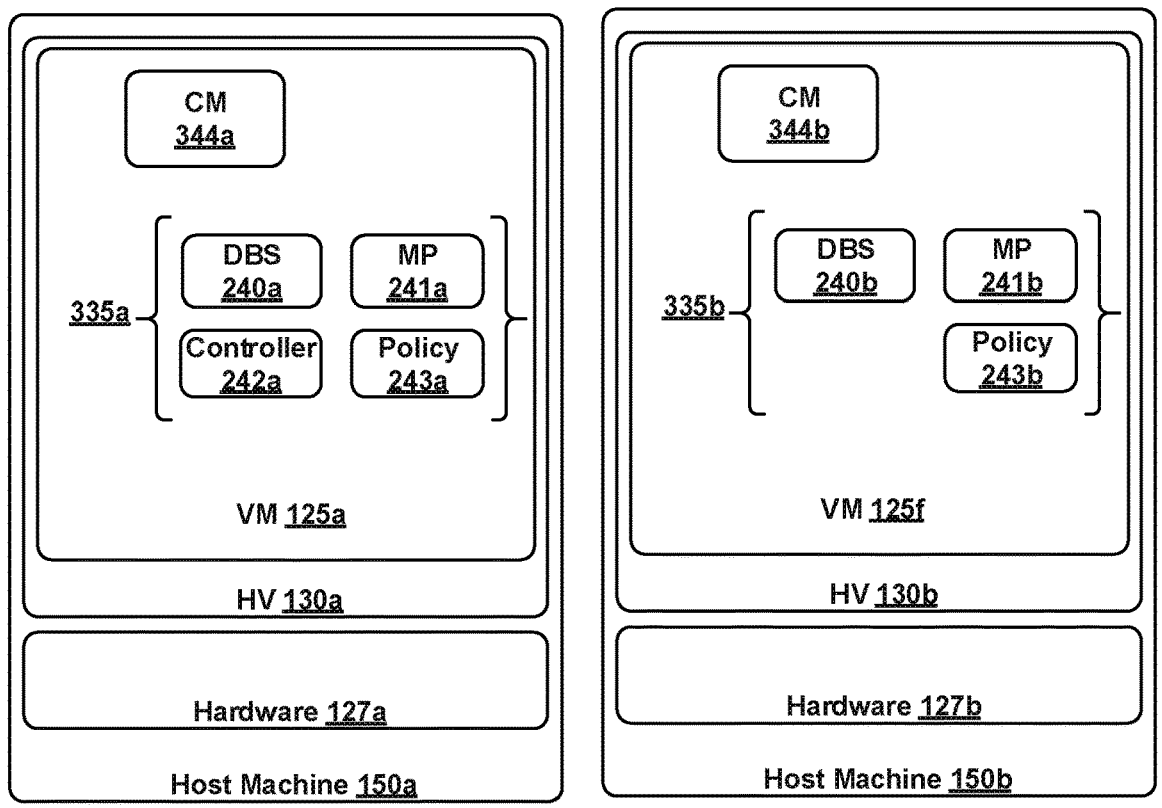
FIG. 7 illustrates three example VMs that are clustered together with the cluster configuration operations of FIGS. 8A-8C, according to certain embodiments described herein.
Figure 7:
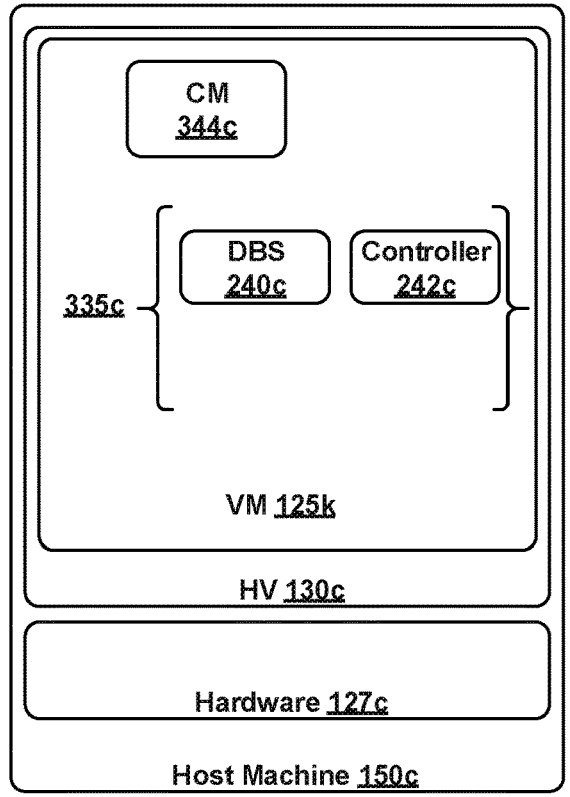

FIG. 7 illustrates VMs 125a, 125f, 125k, executing on host machines 150a, 150b, and 150c, respectively. As described above, VM 125a and VM 125f are already part of a VM cluster. An administrator is able to create a three-VM cluster by causing or requesting VM 125k to join the two-VM cluster, as further described in relation to FIG. 8. VM 125k comprises CM 344c as well as processes 335c, which include DBS 240c and controller 242c. In the example of FIG. 7, the first VM and the first CM refer to VM 125a and CM 344a, respectively. Also, the second VM and the second CM refer to VM 125f and CM 344b, respectively, while the third VM and the third CM refer to VM 125k and CM 344c, respectively. When the third VM is first instantiated, the third CM is configured to perform a set of operations to prepare the third VM to join a cluster. Such operations are described in steps 802-808 of operations 800.

At block 802, the third CM prepares the third VM for clustering. For example, CM 344c prepares VM 125k for clustering. Block 802 is performed similar to block 602 of operations 600.

Figure 8A:
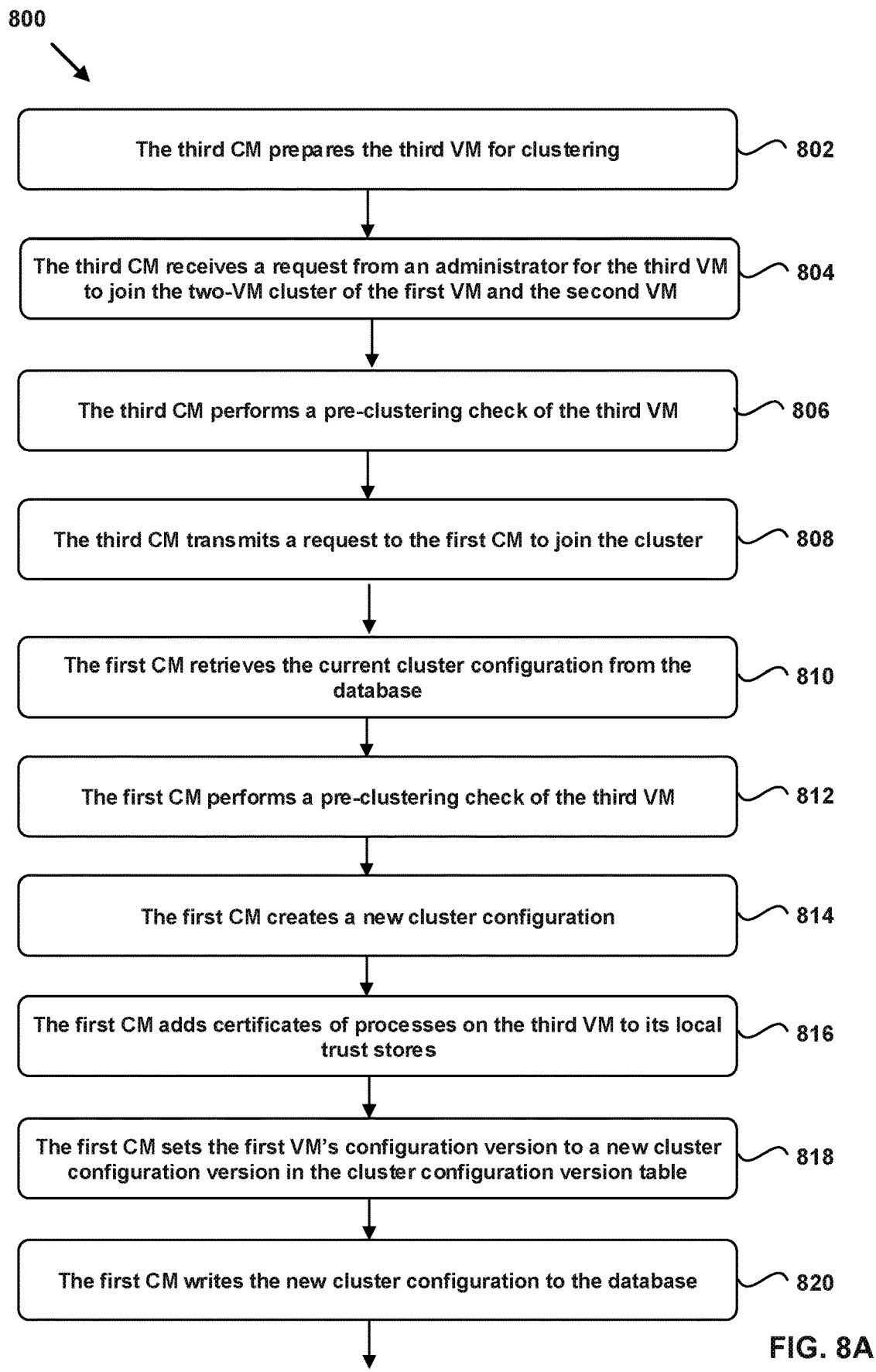
FIGS. 8A-8C illustrate example cluster configuration operations performed by the CMs of the VMs in FIG. 7, according to certain embodiments described herein.
Figure 8B:
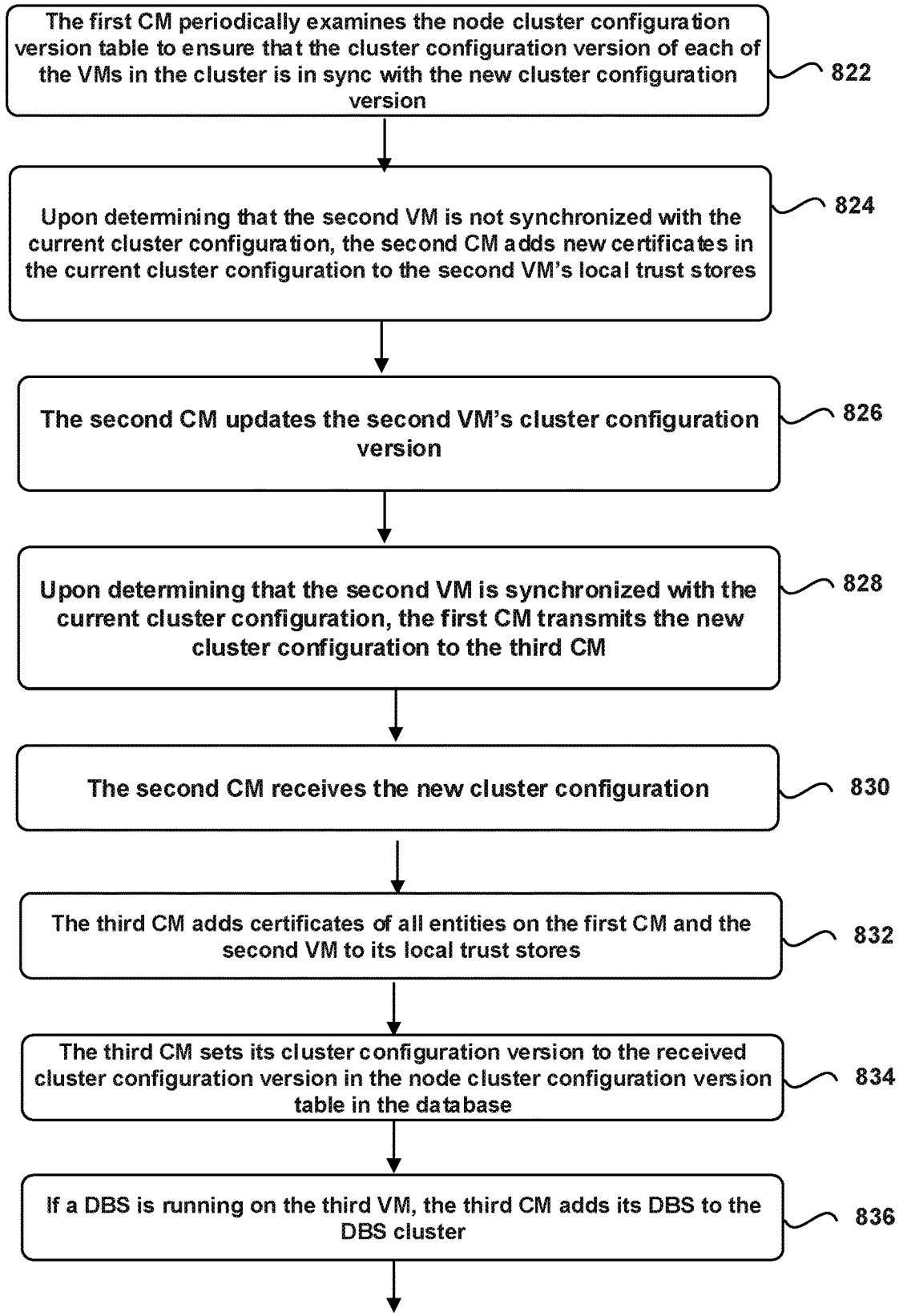
Figure 8C:
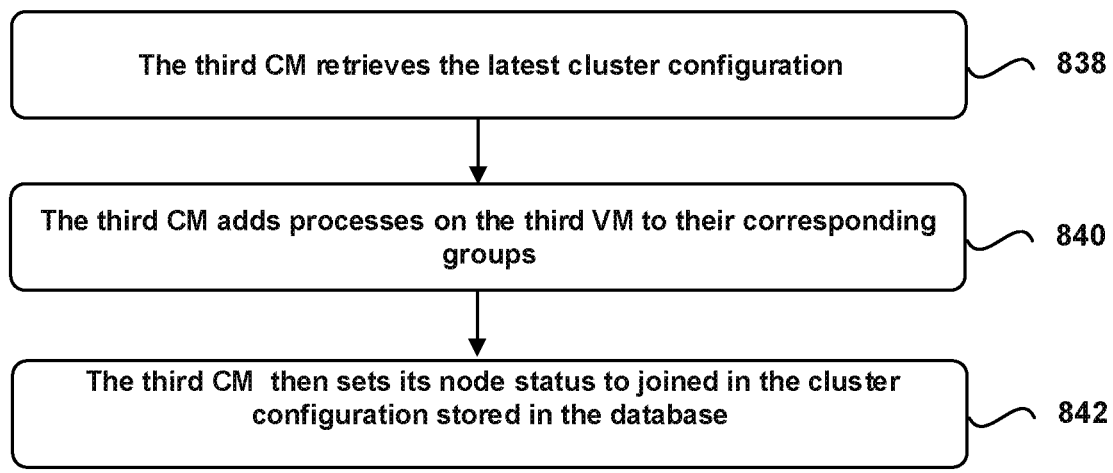

At block 804, the third CM receives a request from an administrator for the third VM to join the two-VM cluster of the first VM and the second VM. In the example used herein, CM 344c receives a request from an administrator for VM 125k join the two-VM cluster of VM 125a and VM 125k. For example, the administrator executes a command on a command line interface (CLI) associated with CM 344c that indicates a request for VM 125k to join the two-VM cluster. In certain aspects, the administrator may select either one of the first VM or the second VM to perform blocks 810 to 820 of operations 800 for adding the third VM to the two-VM cluster. In the example of FIG. 8A, the administrator has selected the first VM to perform operations 810-820, which is why such operations are described with reference to the first VM. As such, the administrator's CLI command causes authentication information to be passed to CM 344c, where authentication information comprises the username and password associated with the first VM as well as an API certificate thumbprint to allow the first VM and the third VM to authenticate each other.

Blocks 806 and 820 of operations 800 are performed similar to blocks 606 and 620 of operations 600. In the example used herein, performing blocks 806-818 results in the first CM creating a new cluster configuration having version "3" and writing the new cluster configuration to database 108.

At block 822, after writing the new cluster configuration to the database, the first CM periodically examines the cluster configuration version table to ensure that each of the VMs in the cluster is in sync with the new cluster configuration version. For example, CM 344a examines the cluster configuration version table to determine whether VM 125f's cluster configuration version matches the current cluster configuration's version.

At the same time, VM 125f is also configured to periodically examine the cluster configuration version table to determine whether the cluster configuration has changed. As such, after CM 344a changes the cluster configuration at block 818, CM 344b's recurring examination of the cluster configuration version table would indicate that VM 125f is not synchronized with the current cluster configuration. Therefore, CM 244b performs operations 824 and 826 to update the VM 125f's cluster configuration.

At block 824, upon determining that the second VM is not synchronized with the current cluster configuration, the second CM adds new certificates in the current cluster configuration, which are the certificates of the third VM, to the second VM's local trust stores. For example, CM 344b adds the certificates of processes 335c to its local trust stores.

Note that when a new VM is added to a cluster, all read operations in the system would be directed to the DBS executing on the new VM. For example, when VM 125*k* is added to the two-VM cluster, all reads in the network control system 100 are directed to DBS 240*c*. As such, it is important for VM 125*a* to ensure that VM 125*f* is synchronized with the latest cluster configuration because otherwise VM 125*f* would not have access to the certificates of VM 125*k* and, therefore, processes 335*b* would not be able to directly communicate with processes 335*c*, including DBS 240*c*. If, for example, VM 125*f* does not have access to the certificate of DBS 240*c*, VM 125's processes would no longer able to access database 108, which results in VM 125*f* being unable to synchronize itself with the latest cluster configuration. In certain aspects, CM 344*a* is configured to wait for a defined period of time to ensure that VM 125*f* is synchronized with the changed cluster configuration. However, in certain situations, VM 125*f* may not be operating when VM 125*k* is being added to the cluster. In such situations, VM 125*f* would not be able to synchronize itself with the changed configuration and its processes 335*b* would, therefore, be unable to communicate with processes 335*c*.

To address such situations, one of a number of techniques may be utilized to ensure all existing VMs in a cluster are synchronized with changes in the cluster configuration as a result of a new VM being added to the cluster.

The first technique involves configuring CMs 344 to require all existing VMs 125 in a cluster to be operational or running when a new VM is being added to the cluster. That is, a CM 344 performing the cluster configuration operations may be configured to fail the join operation if one or more of the existing VMs 125 in the cluster are not synchronized within the defined time period. In the example above, when using first technique, CM 344*a* is configured to fail the join operation of VM 125*k* if VM 125*f* is not able to synchronize itself with the changed cluster configuration within a defined period.

The second technique involves disabling mutual authentication if, for example, CM 344*b* does not synchronize VM 125*f* in time and is not able to access DBS 240*c* of VM 125*k*. In such an example, even though VM 125*f* is non-operational, VM 125*k* is able to access the certificates of processes 335*b* of VM 125*f* because they are stored in database 108 as part of the cluster configuration. As a result, DBS 240*c* is able to trust CM 344*b*. In that example, when VM 125*f* becomes operational again, CM 344*b* is configured to access its locally stored DB connection file, which only includes connection information relating to DBS 240*a* and not DBS 240*c*, and retrieve the DBS cluster configuration through DBS 240*a*. In the event that CM 344*b* is required to communicate with DBS 240*c*, CM 344*b* may be configured not to authenticate DBS 240*c*.

The third technique involves using REST APIs. For example, if VM 125*f* restarts after being non-operational and is not able to communicate with DBS 240*c* directly (e.g., using DBS 240*c*'s IP address and port number), VM 125*f* may be configured to use REST APIs to communicate with any VMs, which were part of the cluster before VM 125*f* failed, in order to retrieve the latest cluster configuration. For example, after VM 125*f* becomes operational again, CM 344*b* may be configured to cache and read the old cluster configuration (e.g., cluster configuration prior to VM 125*k* joining) that it had stored in its local storage resources before failing. The old cluster configuration indicates VM 125*a* as being part of the cluster before VM 125*f* failed. As such, CM 344*b* makes a REST API call to VM 125*a* to retrieve the latest cluster configuration. The REST API server running on VM 125*a* then routes the API call to DBS 240*a*, which retrieves the latest cluster configuration from database 108. The REST API server then transmits the latest cluster configuration to CM 344*b*, which uses the latest cluster configuration to synchronize VM 125*f* by adding certificates of processes 335*c* to the local trust stores associated with VM 125*f*.

At block 826, the second CM updates the second VM's cluster configuration version in the cluster configuration version table. For example, CM 344*b* changes the second VM's cluster configuration version from "2" to "3" in the version table.

At block 828, upon determining that the second VM is synchronized with the current cluster configuration, the first CM transmits the new cluster configuration to the third CM. For example, based on a recurring examination of the version table, CM 344*a* determines that VM 125*f* is now synchronized with cluster configuration version "3." As such, the CM 344*a* transmits the new cluster configuration to CM 344*c*. In certain aspects, CM 344*a* and CM 344*c* may communicate together using REST API servers running on VMs 125*a* and 125*k*. Block 828 may be performed similar to block 622 of operations 600.

Blocks 830 through 842 are performed similar to blocks 624 through 626 of operations 600.

After operations 800 are performed, processes 335*a*, 335*b*, 335*c* are able to directly communicate together, share workloads, and, thereby, enable database 108, management plane 105, and CCP 110 to operate in a distributed manner.

Figure 9:
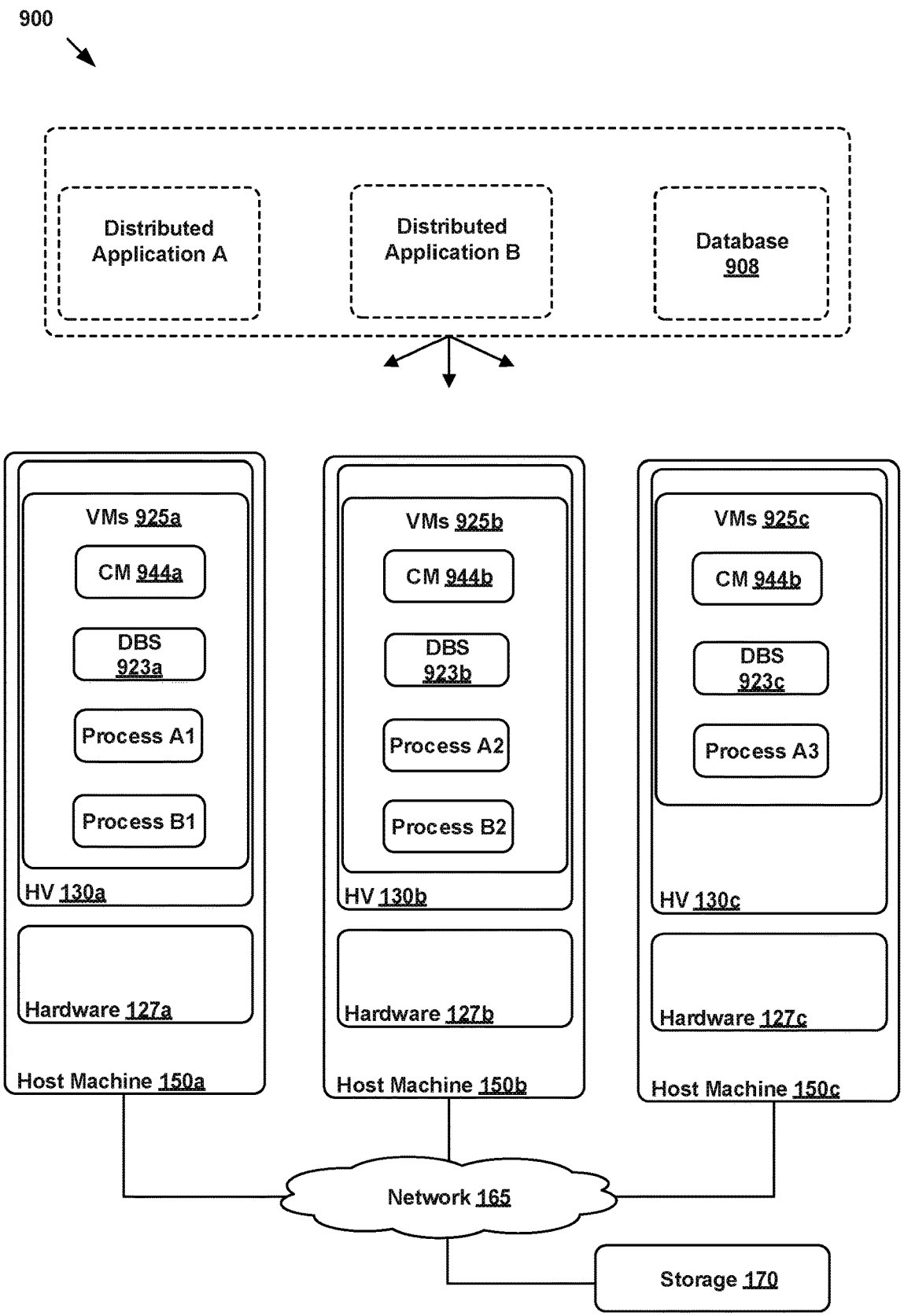
FIG. 9 illustrates an example system where the aspects described herein may be implemented.
Figure 10:
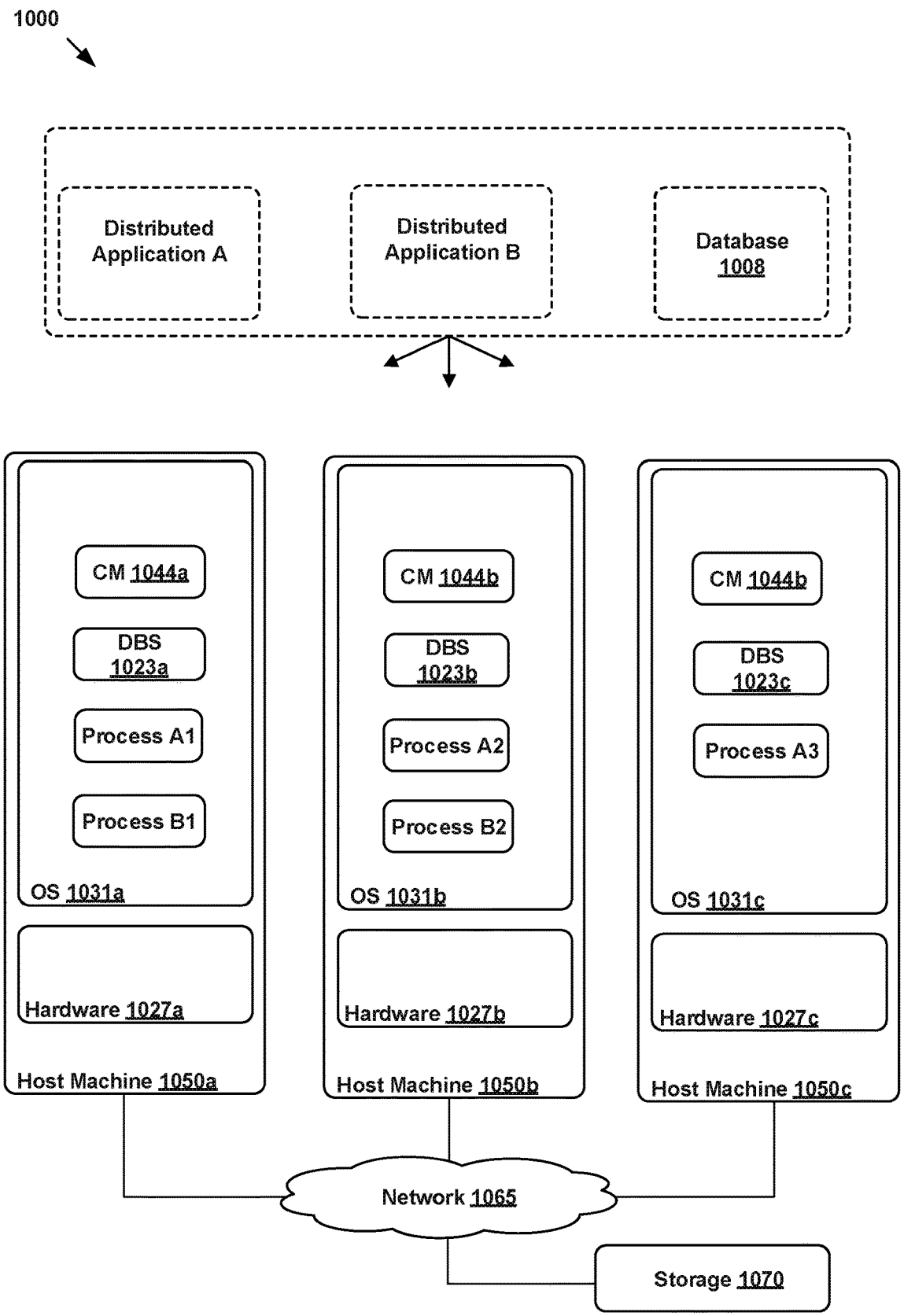
FIG. 10 illustrates an example system where the aspects described herein may be implemented.

As described above, CMs may be used for clustering any type of node (e.g., virtual or physical) in any type of system. Two different examples of systems are illustrated in FIGS. 9 and 10. The example system in FIG. 9 is used to illustrate that the aspects described herein need not be applied to clustering processes associated with distributed applications in a network control system or any SDN-related system. The example system in FIG. 10 is used to illustrate that processes of distributed applications in a system may execute on physical computing devices instead of VCIs, such as VMs.

FIG. 9 illustrates another example system 900 including distributed application A, distributed application B, and distributed database 908. Processes A1, A2, and A3 are configured to implement the functions of distributed application A. Processes B1 and B2 are configured to implement the functions of distributed application B. In system 900, CMs 944*a*-944*c* running on VMs 925*a*-925*c* are configured to perform a set of operations similar to operations 400, 600, and 800 to securely and efficiently create a three-VM cluster of VMs 925*a*-925*c* and a DBS cluster of DBSs 923*a*, 923*b*, and 923*c*.

FIG. 10 illustrates another example system 1000 including distributed application A, distributed application B, and distributed database 1008. In system 1000, processes associated with the distributed application as well as CMs 1044 are executing in the use space of operating systems 1031 of physical machines 1050 (e.g., similar to host machine 150). Processes A1, A2, and A3 are configured to implement the functions of distributed application A. Processes B1 and B2 are configured to implement the functions of distributed application B. In system 1000, CMs 1044*a*-1044*c* are configured to perform a set of operations similar to operations 400, 500, and 600 to securely and efficiently create a three-node cluster of host machines 1050*a*-1050*c* and a DBS cluster of DBSs 1023*a*, 1023*b*, and 1023*c*. Note that host machines 1050 of FIG. 10 are similar to host machines 150 of FIG. 1 and include hardware components 1027 that are also similar to hardware components 127 of FIG. 1. Further, network 1065 and storage 1070 are similar to network 165 and storage 170 of FIG. 1.

Accordingly, the aspects described herein provide a technical solution to a technical problem of efficiently and securely creating multi-node clusters. The aspects described herein utilize trust stores to allow processes associated with one or more distributed applications to authenticate each other. In addition, in the aspects described herein, username and passwords as well as certificate thumbprints are used by various nodes to authenticate each other. Without authentication, cluster configuration operations prone to security attacks, such as man-in-the-middle attacks. A man-in-the-middle attack (MITM) is an attack where the attacker secretly relays and possibly alters the communication between two parties who believe they are directly communicating with each other. In addition, the aspects described herein utilize a strongly consistent database application for storing cluster configuration information as well as group directory, membership, and status information. Such information is used by all nodes in a cluster to efficiently remain synchronized throughout the cluster's life. If a strongly consistent database application is not used, nodes and processes within a cluster have to constantly communicate together in order to remain synchronized etc. As such, the aspects described herein reduce the amount of data that needs to be transmitted over a network as well as the compute cycles required to ensure that the nodes remain synchronized.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of adding one or more nodes to a first cluster including a first node in a computer system, the method comprising:
   receiving, by the first node, a first request from a second node, the first request indicating an intention of the second node to join the cluster, wherein:
      the first node is configured to execute a first one or more processes associated with one or more distributed applications;
      the first request includes authentication information associated with the second node; and
      the authentication information comprises one or more security certificates for a second one or more processes running on the second node;
   retrieving, by the first node, a cluster configuration associated with the cluster from a database;
   creating, by the first node, an updated cluster configuration using the cluster configuration and the authentication information;
   populating, by the first node, a trust store associated with each of the first one or more processes with the authentication information to allow the first one or more processes to authenticate the second one or more processes running on the second node;
   writing, by the first node, the updated cluster configuration to the database;
   providing, by the first node, the updated cluster configuration to the second node;
   determining, by a first process of the first one or more processes, that the first process can trust a second process of the second one or more processes based on retrieving, from the trust store associated with the first process, a corresponding security certificate of the one or more security certificates; and
   communicating, by the first process, with the second process based on the determining that the first process can trust the second process.

2. The method of claim 1, further comprising:
   prior to receiving the first request, exchanging second authentication information between the first one or more processes to allow the first one or more processes to authenticate each other.

3. The method of claim 1, wherein the database is a distributed database.

4. The method of claim 3, wherein:
   the first one or more processes include a first database server (DBS) associated with the distributed database,
   retrieving the cluster configuration from the database is through the first DBS, and
   writing the updated cluster configuration to the database is through the first DBS.

5. The method of claim 4, further comprising:
   creating a DBS cluster configuration for a DBS cluster including the first DBS; and
   storing the DBS cluster configuration in the distributed database prior to receiving the first request, wherein:
      the second node retrieves the DBS cluster configuration,
      the second node adds a second DBS executing on the second node to the DBS cluster by updating the DBS cluster configuration after receiving the updated cluster configuration from the first node, and
      after the second DBS is added to the DBS cluster, the first DBS and the second DBS are configured to be able to maintain consistent instances of the distributed database.

6. The method of claim 4, further comprising:
   writing a DB connection information to a DB connection information file stored in storage resources of the first node, wherein:
      the DB connection information comprises information relating to the first DBS, and
      the DB connection information is used by each of the first one of more processes to connect to the first DBS.

7. The method of claim 1, further comprising:
   creating a group membership table for each process type associated with the first one or more processes; and
   adding each of the first one or more processes as a member to a corresponding group membership table based on a type of the process, wherein a group membership table is used by each member to check a status of each other member of the group membership table.

8. The method of claim 1, further comprising:
   creating a cluster configuration version table;
   storing the cluster configuration version table in the database;
   prior to receiving the first request, setting a cluster configuration version of the first node in the cluster configuration version table to a first version associated with the first cluster changing the cluster configuration version of the first node in the cluster configuration version table from the first version associated with the first cluster to a second version associated with the second cluster; and
   periodically examining the cluster configuration version table to determine whether the first node is synchronized with a latest cluster configuration.

9. The method of claim 1, wherein the first request comprises a username and a password associated with the first node, the method further comprising:
   authenticating the second node based on the username and password;
   transmitting an application programming interface (API) certificate to the second node, wherein the second node authenticates the first node by comparing the API certificate with a thumbprint of the API certificate that is stored in storage resources of the second node.

10. The method of claim 1, wherein after returning the updated cluster configuration to the second node, the second node:
   receives the updated cluster configuration from the first node, the updated cluster configuration comprising second authentication information associated with the first node;

associates the second one or more processes with the second authentication information to allow the second one or more processes to authenticate the first one or more processes;

sets a cluster configuration version of the second node to a cluster configuration of the second cluster in a cluster configuration version table stored in the database;

retrieves a latest cluster configuration from the database;

adds each of the second one or more processes, except for a second DBS of the second one or more processes, as a member to a corresponding group membership table, wherein a group membership table is used by each member to check a status of each other member of the group membership table;

generates an updated cluster configuration by setting a status of the second node in the latest cluster configuration to joined;

stores the updated cluster configuration in the database; and periodically examines the cluster configuration version table to determine whether the second node is synchronized with another latest cluster configuration.

11. The method of claim 1, further comprising:

receiving a second request for a third node to join the second cluster, wherein the second request comprises second authentication information associated with the third node;

retrieving the updated cluster configuration associated with the second cluster from the database;

creating a third cluster configuration using the updated cluster configuration and the second authentication information;

associating the first one or more processes with the second authentication information to allow the first one or more processes to authenticate a third one or more processes running on the third node;

writing the third cluster configuration to the database; and upon the first node and the second node being in synchronization with the third cluster configuration, returning the third cluster configuration to the third node.

12. The method of claim 11, further comprising determining the second node is in synchronization with the third cluster configuration by periodically examining a cluster configuration version table to determine whether a cluster configuration version of the second node matches the cluster configuration version of the third cluster.

13. The method of claim 1, wherein the one or more distributed applications include a software defined networking (SDN) management plane and a SDN control plane.

14. A system, comprising:

a memory comprising executable instructions; and a processor in data communication with the memory and configured to execute the instructions to cause the system to:

receive, by a first node in a cluster, a first request from a second node, the first request indicating an intention of the second node to join the cluster, wherein:

the first node is configured to execute a first one or more processes associated with one or more distributed applications;

the first request includes authentication information associated with the second node; and the authentication information comprises one or more security certificates for a second one or more processes running on the second node;

retrieve, by the first node, a cluster configuration associated with the cluster from a database;

create, by the first node, an updated cluster configuration using the cluster configuration and the authentication information;

populate, by the first node, a trust store associated with each of the first one or more processes with the authentication information to allow the first one or more processes to authenticate the second one or more processes running on the second node;

write, by the first node, the updated cluster configuration to the database;

provide, by the first node, the updated cluster configuration to the second node;

determine, by a first process of the first one or more processes, that the first process can trust a second process of the second one or more processes based on retrieving, from the trust store associated with the first process, a corresponding security certificate of the one or more security certificates; and communicate, by the first process, with the second process based on the determining that the first process can trust the second process.

15. The system of claim 14, wherein the processor is further configured to cause the first node to:

prior to receiving the first request, exchange second authentication information between the first one or more processes to allow the first one or more processes to authenticate each other.

16. The system of claim 14, wherein the database is a distributed database.

17. The system of claim 16, wherein:

the first one or more processes include a first database server (DBS) associated with the distributed database, the processor being configured to cause the first node to retrieve the cluster configuration from the database comprises the processor being configured to cause the first node to retrieve the cluster configuration from the database through the first DBS, and the processor being configured to cause the first node to write the updated cluster configuration to the database further comprises the processor being configured to cause the first node to write the updated cluster configuration to the database through the first DBS.

18. The system of claim 17, wherein the processor is further configured to cause the first node to:

create a DBS cluster configuration for a DBS cluster including the first DBS;

store the DBS cluster configuration in the distributed database prior to receiving the first request, wherein:

the second node retrieves the DBS cluster configuration, the second node adds a second DBS executing on the second node to the DBS cluster by updating the DBS cluster configuration after receiving the second updated cluster configuration from the first node, and after the second DBS is added to the DBS cluster, the first DBS and the second DBS are configured to be able to maintain consistent instances of the distributed database.

19. A non-transitory computer readable medium having instructions stored thereon that, when executed by a computing system, cause the computing system to perform a method comprising:

receiving, by a first node in a cluster, a first request from a second node, the first request indicating an intention of the second node to join the cluster, wherein:

the first node is configured to execute a first one or more processes associated with one or more distributed applications;

the first request includes authentication information associated with the second node; and the authentication information comprises one or more security certificates for a second one or more processes running on the second node;

retrieving, by the first node, a cluster configuration associated with the cluster from a database;

creating, by the first node, an updated cluster configuration using the cluster configuration and the authentication information;

populating, by the first node, a trust store associated with each of the first one or more processes with the authentication information to allow the first one or more processes to authenticate the second one or more processes running on the second node;

writing, by the first node, the updated cluster configuration to the database;

providing, by the first node, the updated cluster configuration to the second node;

determining, by a first process of the first one or more processes, that the first process can trust a second process of the second one or more processes based on retrieving, from the trust store associated with the first process, a corresponding security certificate of the one or more security certificates; and communicating, by the first process, with the second process based on the determining that the first process can trust the second process.

20. The non-transitory computer readable medium of claim 19, wherein the method further comprises:

prior to receiving the first request, exchanging second authentication information between the first one or more processes to allow the first one or more processes to authenticate each other.

* * * * *